(12) United States Patent
Araki

(10) Patent No.: US 12,221,547 B2
(45) Date of Patent: Feb. 11, 2025

(54) ACTIVE ENERGY RAY-CURABLE INK AND IMAGE RECORDING METHOD

(71) Applicant: FUJIFILM Corporation, Tokyo (JP)

(72) Inventor: Kenjiro Araki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 204 days.

(21) Appl. No.: 17/945,079

(22) Filed: Sep. 14, 2022

(65) Prior Publication Data

US 2023/0023473 A1 Jan. 26, 2023

Related U.S. Application Data

(63) Continuation of application No. PCT/JP2021/004358, filed on Feb. 5, 2021.

(30) Foreign Application Priority Data

Mar. 26, 2020 (JP) ................. 2020-056585

(51) Int. Cl.
| | |
|---|---|
| *C09D 11/322* | (2014.01) |
| *B41J 2/01* | (2006.01) |
| *B41J 2/21* | (2006.01) |
| *B41M 7/00* | (2006.01) |
| *C09D 11/101* | (2014.01) |
| *C09D 11/38* | (2014.01) |

(52) U.S. Cl.
CPC ............ *C09D 11/322* (2013.01); *B41J 2/01* (2013.01); *B41J 2/2107* (2013.01); *B41J 2/2117* (2013.01); *B41M 7/0081* (2013.01); *C09D 11/101* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 10,072,164 B2 | 9/2018 | Ishima et al. | |
| 10,526,499 B2 | 1/2020 | Saito | |
| 10,781,330 B2 | 9/2020 | Koyama et al. | |
| 10,864,734 B2 | 12/2020 | Seki | |
| 2008/0075882 A1* | 3/2008 | Hayata ................ | C09D 11/101 427/542 |
| 2008/0090931 A1* | 4/2008 | Nagvekar ............ | C09D 11/101 525/254 |
| 2008/0174650 A1 | 7/2008 | Nakazawa et al. | |
| 2009/0087626 A1* | 4/2009 | Hayata ................ | C09D 11/101 428/195.1 |
| 2009/0226675 A1* | 9/2009 | Takahashi ............ | C09D 11/101 526/264 |
| 2012/0028002 A1* | 2/2012 | Yokoi .................. | C09D 11/101 522/46 |
| 2015/0030825 A1 | 1/2015 | Ishima et al. | |
| 2016/0251527 A1* | 9/2016 | Okamoto ............. | C09D 11/322 522/39 |

FOREIGN PATENT DOCUMENTS

| | | |
|---|---|---|
| CN | 105408367 | 3/2016 |
| CN | 105556390 | 5/2016 |
| CN | 108699373 | 10/2018 |
| CN | 110475830 | 11/2019 |

(Continued)

OTHER PUBLICATIONS

Office Action of Japan Counterpart Application, with English translation thereof, issued on May 9, 2023, pp. 1-6.

(Continued)

*Primary Examiner* — Manish S Shah
(74) *Attorney, Agent, or Firm* — JCIPRNET

(57) ABSTRACT

An active energy ray-curable ink including a radical polymerizable monomer, a radical polymerization initiator, a pigment, a pigment dispersing resin, an organic onium salt, and a radical polymerization inhibitor, wherein the content of the radical polymerization inhibitor is 0.05% to 5.0% by mass of the total amount of the active energy ray-curable ink and an image recording method.

11 Claims, No Drawings

(56) References Cited

FOREIGN PATENT DOCUMENTS

| | | |
|---|---|---|
| EP | 1688467 | 8/2006 |
| EP | 1826206 | 8/2007 |
| EP | 2236568 | 10/2010 |
| JP | 2000343022 | 12/2000 |
| JP | 2006008998 | 1/2006 |
| JP | 2006213883 | 8/2006 |
| JP | 2006249388 | 9/2006 |
| JP | 2008173850 | 7/2008 |
| JP | 2008221651 | 9/2008 |
| JP | 2008266561 | 11/2008 |
| JP | 2010254750 | 11/2010 |
| JP | 2010280170 | 12/2010 |
| JP | 2011122107 | 6/2011 |
| JP | 2011213934 | 10/2011 |
| JP | 2013159716 | 8/2013 |
| JP | 2015160890 | 9/2015 |
| JP | 2019089960 | 6/2019 |
| JP | 2019104251 | 6/2019 |
| JP | 2019202459 | 11/2019 |
| JP | 2019214167 | 12/2019 |
| WO | 2013118735 | 8/2013 |
| WO | 2015046178 | 4/2015 |
| WO | 2019098093 | 5/2019 |
| WO | 2019121093 | 6/2019 |

OTHER PUBLICATIONS

"International Search Report (Form PCT/ISA/210) of PCT/JP2021/004358," mailed on Apr. 20, 2021, with English translation thereof, pp. 1-6.

"Written Opinion of the International Searching Authority (Form PCT/ISA/237)" of PCT/JP2021/004358, mailed on Apr. 20, 2021, with English translation thereof, pp. 1-6.

Office Action of China Counterpart Application, with English translation thereof, issued on Feb. 4, 2023, pp. 1-17.

Office Action of China Counterpart Application, with English translation thereof, issued on May 20, 2023, pp. 1-19.

"Search Report of Europe Counterpart Application", issued on Aug. 4, 2023, pp. 1-6.

\* cited by examiner

ACTIVE ENERGY RAY-CURABLE INK AND IMAGE RECORDING METHOD

CROSS-REFERENCE TO RELATED APPLICATIONS

This application is a continuation application of International Application No. PCT/JP2021/004358, filed Feb. 5, 2021, the disclosure of which is incorporated herein by reference in its entirety. Further, this application claims priority from Japanese Patent Application No. 2020-056585, filed Mar. 26, 2020, the disclosure of which is incorporated herein by reference in its entirety.

BACKGROUND OF THE INVENTION

1. Field of the Invention

The present disclosure relates to an active energy ray-curable ink and an image recording method.

2. Description of the Related Art

An image recording method in which an ink is applied to a recording medium and the ink deposited on the recording medium is irradiated with an active energy ray, such as ultraviolet radiation, to cure and form an image is known as an image recording method. In the image recording method according to the above aspect, an ink that cures when irradiated with an active energy ray is used as an ink.

For example, JP2011-122107A discloses a nonaqueous ink that addresses issues unique to nonaqueous curable inks, that has suitable curability and excellent ejection stability, and that enables the formation of images having high transparency and high abrasion resistance. The nonaqueous ink includes coloring material particles, a dispersing agent, a radical polymerizable compound, and a cation polymerizable compound, wherein the coloring material particles have an average particle size of 1 to 50 nm, and the value represented by Expression: (D90-D10) is 100 nm or less, where D90 represents the particle size at which the integral of a distribution function dG=F(D)dD (where G represents the number of the pigment particles and D represents particle size) is 0.9 (90% by number) of the total number of the coloring material particles, and D10 represents the particle size at which the above integral is 0.1 (10% by number) of the total number of the coloring material particles.

JP2011-213934A discloses a radiation-curable ink composition for ink-jet printing which is excellent in terms of adhesiveness, low viscosity, odor, dermal irritancy, and curability. The radiation-curable ink composition for ink-jet printing includes a photopolymerizable compound and a photopolymerization initiator, wherein the radiation-curable ink composition for ink-jet printing further includes a cation polymerizable functional group-containing polymer and the content of the cation polymerizable functional group-containing polymer is 0.3% to 10% by mass of the total amount of the ink composition.

JP2006-213883A discloses an active light-curable ink jet ink that enables a high-definition image which has excellent character quality and in which color mixing is absent to be recorded with high consistency regardless of the printing environment. The active light-curable ink jet ink includes at least an oxetane compound or an alicyclic epoxy compound, which serves as a photopolymerizable compound, and a (meth)acrylate compound, wherein the active light-curable ink jet ink includes, as photopolymerization initiators, a photoacid generator and a photoradical generator at contents of 1% to 10% by mass and 0% to 1% by mass, respectively.

JP2006-8998A discloses an ink jet ink that can be suitably used as an ink jet ink since the ink has low viscosity and can be cured in a short time and that enables the formation of characters that are excellent in terms of water resistance, solvent resistance, friction resistance, and the like compared with polymerizable inks known in the related art since a resin formed by polymerization of the ink has excellent adhesiveness to a printing medium and excellent rubfastness.

The ink jet ink includes a resin precursor having radical polymerizability, a radical photopolymerization initiator used for causing a radical polymerization reaction of the resin precursor upon irradiation with light, a resin precursor having cation polymerizability, a cation photopolymerization initiator used for causing a cation polymerization reaction of the resin precursor upon irradiation with light, and a colorant.

SUMMARY OF THE INVENTION

In image recording in which an ink that cures upon being irradiated with an active energy ray (hereinafter, such an ink is also referred to as "active energy ray-curable ink") is used, in the case where an image is recorded by ejecting the ink from an ink jet head including a liquid repelling film disposed on the nozzle surface, further improvement of the discharge performance of the ink may be required.

In addition, naturally, the active energy ray-curable ink is required to have certain curability with which the ink is cured upon being irradiated with an active energy ray.

An object of an aspect of the present disclosure is to provide an active energy ray-curable ink that is excellent in terms of the discharge performance with which the ink is ejected from an ink jet head including a liquid repelling film disposed on the nozzle surface and the curability with which the ink is cured upon being irradiated with an active energy ray and an image recording method in which the active energy ray-curable ink is used.

Specific means for achieving the above object includes the following aspects.

<1> An active energy ray-curable ink including a radical polymerizable monomer, a radical polymerization initiator, a pigment, a pigment dispersing resin, an organic onium salt, and a radical polymerization inhibitor, wherein a content of the radical polymerization inhibitor is 0.05% to 5.0% by mass of a total amount of the active energy ray-curable ink.

<2> The active energy ray-curable ink described in <1>, wherein a content of the radical polymerizable monomer is 80% by mass or more of a total amount of a polymerizable compound included in the active energy ray-curable ink.

<3> The active energy ray-curable ink described in <1> or <2>, wherein a content of the organic onium salt is 0.01% to 8.0% by mass of the total amount of the active energy ray-curable ink.

<4> The active energy ray-curable ink described in any one of <1> to <3>, wherein the content of the organic onium salt is 0.05% to 8.0% by mass of the total amount of the active energy ray-curable ink.

<5> The active energy ray-curable ink described in any one of <1> to <4>, wherein a mass ratio of the content of the organic onium salt to the content of the radical polymerization inhibitor is 0.10 to 150.

<6> The active energy ray-curable ink described in any one of <1> to <5>,
wherein the radical polymerization inhibitor includes at least one selected from the group consisting of a nitroso aluminum compound, a quinone compound, and a nitroxyl radical compound.

<7> The active energy ray-curable ink described in any one of <1> to <6>,
wherein the organic onium salt has a ClogP of 4.0 or more.

<8> The active energy ray-curable ink described in any one of <1> to <7>,
wherein a mass ratio of the content of the organic onium salt to a content of the pigment dispersing resin is 0.02 or more.

<9> An image recording method including:
a step of applying the active energy ray-curable ink described in any one of <1> to <8> to a recording medium to form an ink film, by ejecting the active energy ray-curable ink from an ink jet head including a liquid repelling film disposed on a nozzle surface of the ink jet head; and
an irradiation step of irradiating the ink film with an active energy ray.

<10> The image recording method described in <9>,
wherein the irradiation step includes irradiating the ink film with the active energy ray in an atmosphere having an oxygen concentration of 5% by volume or less.

According to an aspect of the present disclosure, an active energy ray-curable ink that is excellent in terms of the discharge performance with which the ink is ejected from an ink jet head including a liquid repelling film disposed on the nozzle surface and the curability with which the ink is cured upon being irradiated with an active energy ray and an image recording method in which the active energy ray-curable ink is used may be provided.

DESCRIPTION OF THE PREFERRED EMBODIMENTS

In the present disclosure, a numerical range expressed using "to" means the range specified by the lower and upper limits described before and after "to", respectively.

In the present disclosure, in the case where a composition includes a plurality of substances that correspond to a component of the composition, the content of the component in the composition is the total content of the substances in the composition unless otherwise specified.

In the present disclosure, when numerical ranges are described in a stepwise manner, the upper or lower limit of a numerical range may be replaced with the upper or lower limit of another numerical range, respectively, and may also be replaced with the values described in Examples below.

In the present disclosure, the term "step" refers not only to an individual step but also to a step that is not distinguishable from other steps but achieves the intended purpose of the step.

In the present disclosure, a combination of preferable aspects is a more preferable aspect.

In the present disclosure, the term "light" conceptually subsumes active energy rays, such as γ-radiation, β-radiation, an electron beam, ultraviolet radiation, and visible light.

In the present disclosure, ultraviolet radiation may be referred to as "ultraviolet (UV) light".

In the present disclosure, the concept of the term "(meth)acrylate" includes both acrylate and methacrylate. The concept of the term "(meth)acryloyl group" includes both acryloyl and methacryloyl groups. The concept of the term "(meth)acrylic acid" includes both acrylic acid and methacrylic acid.

In the present disclosure, the term "image" refers to a film formed using an ink. The term "image recording" refers to the formation of an image, that is, a film.

In the present disclosure, the concept of the term "image" includes a solid image.

Active Energy Ray-Curable Ink

An active energy ray-curable ink according to the present disclosure is an active energy ray-curable ink including a radical polymerizable monomer, a radical polymerization initiator, a pigment, a pigment dispersing resin, an organic onium salt, and a radical polymerization inhibitor. The content of the radical polymerization inhibitor is 0.05% to 5.0% by mass of the total amount of the active energy ray-curable ink.

Hereinafter, the active energy ray-curable ink is also referred to as simply as "ink".

The ink according to the present disclosure is excellent in terms of the discharge performance with which the ink is ejected from an ink jet head including a liquid repelling film disposed on the nozzle surface and the curability with which the ink is cured upon being irradiated with an active energy ray.

The reasons for which the advantageous effects are produced are presumably as follows.

In image recording performed using an ink jet method, an ink jet head including a liquid repelling film disposed on the nozzle surface (i.e., ink discharge surface) may be used as an ink jet head.

The intended purpose for which the liquid repelling film is disposed on the nozzle surface is to cause the ink to be rejected by the liquid repelling film, thereby enhance the releasability of an ink from the nozzle surface (specifically, the surface of the liquid repelling film), and consequently reduce the likelihood of the ink that remains on the nozzle surface (specifically, the surface of the liquid repelling film) causing ejection failure (e.g., ejection deflection).

However, in the case where
  an ink jet head including a liquid repelling film disposed on the nozzle surface is used as an ink jet head,
  a radical polymerizable ink that includes a radical polymerizable monomer, a radical polymerization initiator, a pigment, and a pigment dispersing resin is used as an ink, and
  image recording in which the ink is applied to a recording medium and the ink deposited on the recording medium (hereinafter, such an ink is also referred to as "ink film") is irradiated with an active energy ray to cure and form an image is performed, the intended purpose of the liquid repelling film may fail to be achieved to a sufficient degree and, consequently, ejection failure (e.g., ejection deflection) may occur (i.e., the discharge performance may become degraded).

The reasons for which the ejection failure occurs are presumably the reasons 1 and 2 below.

Reason 1. A hydrophobic portion of the pigment dispersing resin included in the ink interacts with the liquid repelling film disposed on the nozzle surface. This reduces the releasability of the ink from the surface of the liquid repelling film (i.e., the ease with which the ink is removed from the surface of the liquid repelling film) and causes the ink to remain on the surface of the liquid repelling film.

Reason 2. Leaked light that is the active energy ray with which the ink film is irradiated (e.g., leaked light emitted from a light source for pinning exposure, which may be disposed in the vicinity of an ink jet head) causes the ink that remains on the surface of the liquid repelling film to cure and adhere to the liquid repelling film.

It is considered that the adherence of the ink to the liquid repelling film causes the ejection failure.

As for the reason 1 (ink releasability) above, it is considered that, in the case where the ink according to the present disclosure is used, the pigment dispersing resin included in the ink interacts with the organic onium salt included in the ink and, consequently, the interaction between the pigment dispersing resin and the liquid repelling film becomes weakened. This may improve the releasability of the ink.

As for the reason 2 (adherence by leaked light) above, even if the ink remains on the surface of the liquid repelling film, the likelihood of the leaked light causing the adherence of the ink can be reduced because the ink includes a radical polymerization inhibitor at a content of 0.05% by mass or more.

For the above reasons, it is considered that the ink according to the present disclosure reduces the likelihood of ejection failure occurring when the ink is ejected from the ink jet head and the discharge performance of the ink can be maintained at a suitable level.

Furthermore, since the content of the radical polymerization inhibitor is limited to 5.0% by mass or less, it is considered that the likelihood of the viscosity of the ink being excessively high is reduced and, as a result, the discharge performance of the ink is maintained at a suitable level.

For the above reasons, it is considered that the ink according to the present disclosure is excellent in terms of the discharge performance with which the ink is ejected from an ink jet head including a liquid repelling film disposed on the nozzle surface.

Moreover, since the content of the radical polymerization inhibitor in the ink according to the present disclosure is limited to 5.0% by mass or less, the ink is excellent in terms of the curability with which the ink is cured upon being irradiated with an active energy ray after the ink has been applied to a recording medium (hereinafter, also referred to simply as "curability of the ink").

Each of the constituents that may be included in the ink according to the present disclosure is described below.

Radical Polymerizable Monomer

The ink according to the present disclosure includes at least one radical polymerizable monomer.

In the present disclosure, the term "radical polymerizable monomer" refers to a compound including an ethylenic unsaturated group.

In the present disclosure, the concept of the term "radical polymerizable monomer" also includes a monomer that has both radical polymerizability and cation polymerizability (e.g., vinyl ether compound, such as triethylene glycol divinyl ether).

In the present disclosure, a monomer that has both radical polymerizability and cation polymerizability (e.g., vinyl ether compound, such as triethylene glycol divinyl ether) is included in the concept of the term "radical polymerizable monomer" and is not included in the concept of the term "cation polymerizable monomer".

The ethylenic unsaturated group is preferably a (meth)acryloyl group, a vinyl group, an allyl group, or a styryl group and is more preferably a (meth)acryloyl group or a vinyl group.

The radical polymerizable monomer may include only one ethylenic unsaturated group and may include two or more ethylenic unsaturated groups.

The radical polymerizable monomer may include only one type of an ethylenic unsaturated group and may include two or more types of ethylenic unsaturated groups.

The molecular weight of the radical polymerizable monomer is preferably 280 to 1,500, is more preferably 280 to 1,000, and is further preferably 280 to 800.

The ink according to the present disclosure may include a polymerizable compound other than a radical polymerizable monomer, such as a cation polymerizable monomer, a radical polymerizable resin, or a cation polymerizable resin.

Examples of the cation polymerizable monomer include an oxetane compound and an epoxy compound. An oxetane compound and an epoxy compound are described in, for example, JP2006-152064A.

The proportion of the amount of the radical polymerizable monomer to the total amount of polymerizable compounds included in the ink according to the present disclosure is preferably 80% by mass or more, is more preferably 85% by mass or more, is further preferably 90% by mass or more, and is further preferably 95% by mass or more in order to achieve the advantageous effect to enhance the discharge performance with which the ink is ejected from an ink jet head including a liquid repelling film disposed on the nozzle surface and the advantageous effect to enhance the curability of the ink with further effect.

The proportion of the amount of the radical polymerizable monomer to the total amount of the ink according to the present disclosure is preferably 60% by mass or more, is more preferably 70% by mass or more, is further preferably 73% by mass or more, is further preferably 75% by mass or more, is further preferably 80% by mass or more, and is further preferably 83% by mass or more in order to achieve the advantageous effect to enhance the discharge performance with which the ink is ejected from the above ink jet head and the advantageous effect to enhance the curability of the ink with further effect.

The radical polymerizable monomer included in the ink according to the present disclosure may be a monofunctional radical polymerizable monomer, a difunctional radical polymerizable monomer, or a trifunctional or higher functional radical polymerizable monomer. The radical polymerizable monomer included in the ink according to the present disclosure may include two or more types of the above radical polymerizable monomers in combination.

Note that,
the term "monofunctional radical polymerizable monomer" used herein refers to a radical polymerizable monomer including only one ethylenic unsaturated group,
the term "difunctional radical polymerizable monomer" used herein refers to a radical polymerizable monomer including only two ethylenic unsaturated groups, and
the term "trifunctional or higher functional radical polymerizable monomer" used herein refers to a radical polymerizable monomer including three or more ethylenic unsaturated groups.

Hereinafter, monofunctional radical polymerizable monomer, difunctional radical polymerizable monomer, and trifunctional or higher functional radical polymerizable monomer may be referred to as "monofunctional monomer", "difunctional monomer", and "trifunctional or higher functional monomer", respectively.

The radical polymerizable monomer included in the ink according to the present disclosure preferably includes at least one of a monofunctional monomer (i.e., monofunctional radical polymerizable monomer) or a difunctional monomer (i.e., difunctional radical polymerizable monomer) in consideration of reduction in the viscosity of the ink (e.g., when the ink is used as an ink jet ink, the ease with which the ink is discharged from an ink jet head (hereinafter, this property is also referred to simply as "discharge performance")).

In such a case, the total content of the monofunctional monomer and the difunctional monomer is preferably 40% by mass or more, is more preferably 50% by mass or more, is further preferably 55% by mass or more, and is further preferably 60% by mass or more of the total amount of the ink.

In consideration of the discharge performance of the ink and the abrasion resistance of the image, the radical polymerizable monomer included in the ink according to the present disclosure preferably includes:

at least one of a monofunctional monomer or a difunctional monomer, and
  a trifunctional or higher functional monomer (preferably, trifunctional monomer).

In such a case, the total content of the monofunctional monomer, the difunctional monomer, and the trifunctional or higher functional monomer is preferably 50% by mass or more, is more preferably 60% by mass or more, is further preferably 65% by mass or more, and is further preferably 70% by mass or more of the total amount of the ink.

Monofunctional Monomer

Examples of the monofunctional monomer include a monofunctional (meth)acrylate, a monofunctional (meth) acrylamide, a monofunctional aromatic vinyl compound, a monofunctional vinyl ether, and a monofunctional N-vinyl compound.

Examples of the monofunctional (meth)acrylate include methyl (meth)acrylate, ethyl (meth)acrylate, propyl (meth) acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth) acrylate, lauryl (meth)acrylate, stearyl (meth)acrylate, isostearyl (meth)acrylate, cyclohexyl (meth)acrylate, 4-n-butylcyclohexyl (meth)acrylate, 4-tert-butylcyclohexyl (meth)acrylate, bornyl (meth)acrylate, norbornyl (meth) acrylate, isobornyl (meth)acrylate, adamantyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth) acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, ethylcarbitol (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth)acrylate, 2-phenoxyethyl (meth) acrylate, glycidyl (meth)acrylate, glycidyloxybutyl (meth) acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth) acrylate, 2-hydroxypropyl (meth)acrylate, 2-hydroxybutyl (meth)acrylate, 3-hydroxybutyl (meth)acrylate, 4-hydroxybutyl (meth)acrylate, cyclic trimethylolpropaneformal (meth)acrylate, phenyl glycidyl ether (meth)acrylate, dimethylaminoethyl (meth)acrylate, diethylaminoethyl (meth) acrylate, dimethylaminopropyl (meth)acrylate, diethylaminopropyl (meth)acrylate, trimethoxysilylpropyl (meth) acrylate, trimethylsilylpropyl (meth)acrylate, polyethylene oxide monomethyl ether (meth)acrylate, polyethylene oxide (meth)acrylate, polyethylene oxide monoalkyl ether (meth) acrylate, dipropylene glycol (meth)acrylate, polypropylene oxide monoalkyl ether (meth)acrylate, 2-methacryloyloxyethyl succinate, 2-methacryloyloxyhexahydrophthalic acid, 2-methacryloyloxyethyl-2-hydroxypropyl phthalate, butoxydiethylene glycol (meth)acrylate, trifluoroethyl (meth) acrylate, perfluorooctylethyl (meth)acrylate, 2-hydroxy-3-phenoxypropyl (meth)acrylate, ethylene oxide-modified (hereinafter, referred to as "EO-modified") phenol (meth) acrylate, EO-modified cresol (meth)acrylate, EO-modified nonylphenol (meth)acrylate, propylene oxide-modified (hereinafter, referred to as "PO-modified") nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, and phenoxyethylene glycol (meth)acrylate.

Examples of the monofunctional (meth)acrylamide include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth) acrylamide, N-methylol (meth)acrylamide, N,N-dimethyl (meth)acrylamide, N,N-diethyl (meth)acrylamide, and (meth)acryloyl morpholine.

Examples of the monofunctional aromatic vinyl compound include styrene, dimethylstyrene, trimethylstyrene, isopropylstyrene, chloromethylstyrene, methoxystyrene, acetoxystyrene, chlorostyrene, dichlorostyrene, bromostyrene, vinylbenzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, and 4-t-butoxystyrene.

Examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of the monofunctional N-vinyl compound include N-vinylcaprolactam, N-vinylpyrrolidone, N-vinyloxazolidinone, and N-vinyl-5-methyloxazolidinone.

The monofunctional monomer preferably includes at least one of the monofunctional (meth)acrylate or the monofunctional N-vinyl compound and more preferably includes at least one of a monofunctional (meth)acrylate including an alicyclic structure or the monofunctional N-vinyl compound.

The monofunctional (meth)acrylate including an alicyclic structure is preferably isobornyl (meth)acrylate, norbornyl (meth)acrylate, or adamantyl (meth)acrylate and is more preferably isobornyl (meth)acrylate.

The total proportion of the monofunctional (meth)acrylate (preferably, the monofunctional (meth)acrylate including an alicyclic structure) and the monofunctional N-vinyl compound to the monofunctional monomers is preferably 50% to 100% by mass, is more preferably 60% to 100% by mass, and is further preferably 80% to 100% by mass. The proportion of the monofunctional N-vinyl compound to the monofunctional monomers is preferably 20% by mass or more, is more preferably 30% by mass or more, and is further preferably 50% by mass or more.

Difunctional Monomer

Examples of the difunctional monomer include a difunctional (meth)acrylate, a difunctional vinyl ether, and a difunctional monomer that includes a vinyl ether group and a (meth)acryloyl group.

Examples of the difunctional (meth)acrylate include ethylene glycol di(meth)acrylate, diethylene glycol di(meth)acrylate, triethylene glycol di(meth)acrylate, propylene glycol di(meth)acrylate, dipropylene glycol di(meth)acrylate, tripropylene glycol di(meth)acrylate, polyethylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, EO-modified neopentyl glycol di(meth)acrylate, PO-modified neopentyl glycol di(meth)acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, and tricyclodecanedimethanol di(meth)acrylate.

Examples of the difunctional vinyl ether include 1,4-butanediol divinyl ether, ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, 1,4-cyclohexanedimethanol divinyl ether, bisphenol-A alkylene oxide divinyl ether, and bisphenol-F alkylene oxide divinyl ether.

Examples of the difunctional monomer that includes a vinyl ether group and a (meth)acryloyl group include 2-(2-vinyloxyethoxy)ethyl (meth)acrylate.

Trifunctional or Higher Functional Monomer

Examples of the trifunctional or higher functional monomer include a trifunctional or higher functional (meth)acrylate and a trifunctional or higher functional vinyl ether.

Examples of the trifunctional or higher functional (meth)acrylate include trimethylolethane tri(meth)acrylate, trimethylolpropane tri(meth)acrylate, EO-modified trimethylolpropane tri(meth)acrylate, PO-modified trimethylolpropane tri(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly (meth)acrylate, and tris(2-acryloyloxyethyl)isocyanurate.

Examples of the trifunctional or higher functional vinyl ether include trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, EO-modified trimethylolpropane trivinyl ether, PO-modified trimethylolpropane trivinyl ether, EO-modified ditrimethylolpropane tetravinyl ether, PO-modified ditrimethylolpropane tetravinyl ether, EO-modified pentaerythritol tetravinyl ether, PO-modified pentaerythritol tetravinyl ether, EO-modified dipentaerythritol hexavinyl ether, and PO-modified dipentaerythritol hexavinyl ether.

Urethane (Meth)Acrylate

Examples of the above-described difunctional monomer and the above-described trifunctional or higher functional monomer also include a urethane (meth)acrylate.

Examples of the urethane (meth)acrylate include a urethane (meth)acrylate that is the product of reaction between a difunctional isocyanate compound and a hydroxyl group-containing (meth)acrylate.

Examples of the difunctional isocyanate compound include:

aliphatic diisocyanates, such as methylene diisocyanate, dimethylene diisocyanate, trimethylene diisocyanate, tetramethylene diisocyanate, pentamethylene diisocyanate, hexamethylene diisocyanate, dipropyl ether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropyl ether diisocyanate, and thiodihexyl diisocyanate;

aromatic diisocyanates, such as m-phenylene diisocyanate, p-phenylene diisocyanate, 2,4-tolylene diisocyanate, 2,6-tolylene diisocyanate, dimethylbenzene diisocyanate, ethylbenzene diisocyanate, isopropylbenzene diisocyanate, tolidine diisocyanate, 1,4-naphthalene diisocyanate, 1,5-naphthalene diisocyanate, 2,6-naphthalene diisocyanate, 2,7-naphthalene diisocyanate, meta-xylylene diisocyanate, para-xylylene diisocyanate, and tetramethylxylylene diisocyanate; and alicyclic diisocyanates, such as hydrogenated xylylene diisocyanate, isophorone diisocyanate, and dicyclohexylmethane 4,4'-diisocyanate.

Examples of the hydroxyl group-containing (meth)acrylate include 2-hydroxyethyl (meth)acrylate, 3-hydroxypropyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, phenyl glycidyl ether (meth)acrylate, pentaerythritol (meth)triacrylate, and dipentaerythritol penta(meth)acrylate.

Epoxy (Meth)Acrylate

Examples of the above-described difunctional monomer and the above-described trifunctional or higher functional monomer also include an epoxy (meth)acrylate.

Note that the term "epoxy (meth)acrylate" used herein refers to the product of reaction between a carboxyl group of (meth)acrylic acid and two or three epoxy groups of an epoxy compound including two or three epoxy groups. Therefore, the structure of the epoxy (meth)acrylate does not include an epoxy group. In this respect, the epoxy (meth)acrylate differs from the epoxy compound described above as an example of the cation polymerizable monomer.

Examples of the epoxy (meth)acrylate include the product of reaction between (meth)acrylic acid and an epoxy resin.

Examples of the epoxy resin include a bisphenol-A epoxy resin and a cresol novolac epoxy resin.

Radical Polymerization Initiator

The ink according to the present disclosure includes at least one radical polymerization initiator.

Examples of the radical polymerization initiator include:
- alkylphenone radical polymerization initiators, such as diethoxyacetophenone, 2-hydroxy-2-methyl-1-phenyl-propan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenyl ketone, 2-benzyl-2-(dimethylamino)-4'-morpholinobutyrophenone, and 2-methyl-1-[4-(methylthio)phenyl]-2-morpholinopropan-1-one;
- benzoin radical polymerization initiators, such as benzoin, benzoin methyl ether, and benzoin isopropyl ether;
- acylphosphine oxide radical polymerization initiators, such as bis(2,4,6-trimethylbenzoyl)phenylphosphine oxide and 2,4,6-trimethylbenzoindiphenylphosphine oxide;
- benzyl glyoxy ester; and
- methylphenyl glyoxy ester.

The above specific examples are useful as a low-molecular-weight radical polymerization initiator.

Note that the term "low-molecular-weight radical polymerization initiator" used herein refers to a photopolymerization initiator having a molecular weight of less than 500.

The radical polymerization initiator may include a high-molecular-weight radical polymerization initiator.

Note that the term "high-molecular-weight radical polymerization initiator" used herein refers to a photopolymerization initiator having a molecular weight of 500 or more.

The molecular weight of the high-molecular-weight radical polymerization initiator is preferably 500 to 3,000, is more preferably 700 to 2,500, and is further preferably 900 to 2,100.

The high-molecular-weight radical polymerization initiator is described in, for example, known documents, such as JP2017-105902A (Paragraphs [0038], etc.) and JP2017-522364A (Paragraphs [0017] to [0053]).

The radical polymerization initiator may be a commercial product.

Examples of the commercial product include:
- "Omnirad TPO H" produced by IGM Resins B.V., which is a commercial product of 2,4,6-trimethylbenzoyldiphenylphosphine oxide;
- "Omnirad 819" produced by IGM Resins B.V., which is a commercial product of bis(2,4,6-trimethylbenzoyl)phenylphosphine oxide;
- "Omnirad 369" produced by IGM Resins B.V., which is a commercial product of 2-benzyl-2-(dimethylamino)-4'-morpholinobutyrophenone;
- "Omnirad 907" produced by IGM Resins B.V., which is a commercial product of 2-methyl-1-[4-(methylthio)phenyl]-2-morpholinopropan-1-one; and
- "Omnipol 910" produced by IGM Resins B.V., which is a commercial product of the high-molecular-weight radical polymerization initiator.

The content of the radical polymerization initiator is preferably 1.0% to 20.0% by mass, is more preferably 2.0% to 15.0% by mass, is further preferably 3.0% to 10.0% by mass, and is further preferably 3.0% to 8.0% by mass of the total amount of the ink.

When the content of the radical polymerization initiator is 1.0% to 20.0% by mass, the abrasion resistance of the image is further enhanced.

Pigment

The ink according to the present disclosure includes at least one pigment.

Examples of the pigment include an organic pigment and an inorganic pigment.

Examples of the pigment also include resin particles colored with a dye, a commercial pigment dispersion, and a surface-treated pigment (e.g., a pigment dispersion prepared by dispersing a pigment in a dispersion medium, such as a radical photopolymerizable monomer or an organic solvent, and a surface-treated pigment prepared by treating the surfaces of pigment particles with a resin, a pigment derivative, or the like).

Examples of the pigment include a yellow pigment, a red pigment, a magenta pigment, a blue pigment, a cyan pigment, a green pigment, an orange pigment, a purple pigment, a brown pigment, a black pigment, and a white pigment.

Examples of the pigment also include an invisible pigment capable of absorbing infrared radiation, such as a squarylium pigment.

The content of the pigment in the ink according to the present disclosure is preferably 1.0% to 20.0% by mass and is more preferably 2.0% to 10.0% by mass of the total amount of the ink.

Pigment Dispersing Resin

The ink according to the present disclosure includes at least one pigment dispersing resin.

In the ink according to the present disclosure, the pigment dispersing resin interacts with the pigment and, thereby, the dispersibility of the pigment is maintained.

For details of the pigment and the pigment dispersing resin, the documents known in the related art, such as Paragraphs [0060] to [0074] of WO2015/133605A, Paragraphs [0152] to [0158] of JP2011-225848A, and Paragraphs [0132] to [0149] of JP2009-209352A, may be referred as needed.

The pigment dispersing resin is preferably a pigment dispersing resin that is an amine resin (hereinafter, also referred to as "amine resin dispersing agent").

The amine resin dispersing agent may be a commercial product.

Examples of the commercial amine resin dispersing agent include SOLSPERSE series, such as SOLSPERSE 13940, 17000, 20000, 24000, 26000, 28000, 32000, 35000, 36000, and 39000 (produced by Noveon);
- DISPERBYK series, such as DISPERBYK-108, 109, 161, 162, 163, 164, 167, 168, 180, 182, 184, 185, 2000, 2001, 2008, 2009, 2013, 2022, 2025, 2026, 2050, 2055, 2150, 2155, 2163, 2164, 9076, 9077, and DISPERBYK-9076 (produced by BYK Chemie);
- BYKJET series, such as BYKJET-9150 and 9151 (produced by BYK Chemie);
- Efka series, such as Efka PX4701, Efka PX4703, Efka PX4733, and Efka PU4063 (produced by BASF SE); and
- Dispex Ultra PX 4575 (produced by BASF SE).

The mass ratio of the content of the pigment dispersing resin in the ink according to the present disclosure to the content of the pigment in the ink is preferably 0.05 to 0.90, is more preferably 0.10 to 0.80, and is further preferably 0.20 to 0.60.

The content of the pigment dispersing resin in the ink according to the present disclosure is preferably 0.2% to 10.0% by mass, is more preferably 0.3% to 8.0% by mass, and is further preferably 0.5% to 4.0% by mass of the total amount of the ink.

Organic Onium Salt

The ink according to the present disclosure includes at least one organic onium salt.

As described above, it is considered that the organic onium salt and the pigment dispersing resin included in the ink according to the present disclosure interacts with each other and this reduces the interaction between the liquid repelling film disposed on the nozzle surface and the pigment dispersing resin, enhances the releasability of the ink from the liquid repelling film, and consequently enhances the discharge performance of the ink.

In order to further enhance the releasability and discharge performance of the ink, the ClogP of the organic onium salt is preferably 3.5 or more, is more preferably 4.0 or more, and is further preferably 5.0 or more.

The upper limit for the ClogP of the organic onium salt is not limited and is, for example, 20.

ClogP is the value determined by calculating the common logarithm logP of the 1-octanol/water partition coefficient P and indicates the degree of hydrophobicity. The larger the ClogP value, the higher the degree of hydrophobicity.

In the present disclosure, ClogP is calculated using "ChemDraw (registered trademark) Professional (ver. 16.0.1.4)" produced by PerkinElmer, Inc.

The organic onium salt is preferably at least one selected from the group consisting of an organic sulfonium salt, an organic phosphonium salt, an organic iodonium salt, and an organic ammonium salt and is more preferably at least one selected from the group consisting of an organic sulfonium salt, an organic phosphonium salt, and an organic iodonium salt in order to further enhance the releasability and discharge performance of the ink.

Organic Sulfonium Salt

The organic sulfonium salt is
preferably an organic sulfonium salt that includes at least one structure consisting of one $S^+$ and three aromatic rings bonded thereto.

The organic sulfonium salt is more preferably the compound represented by any one of Formulae (1) to (4) below.

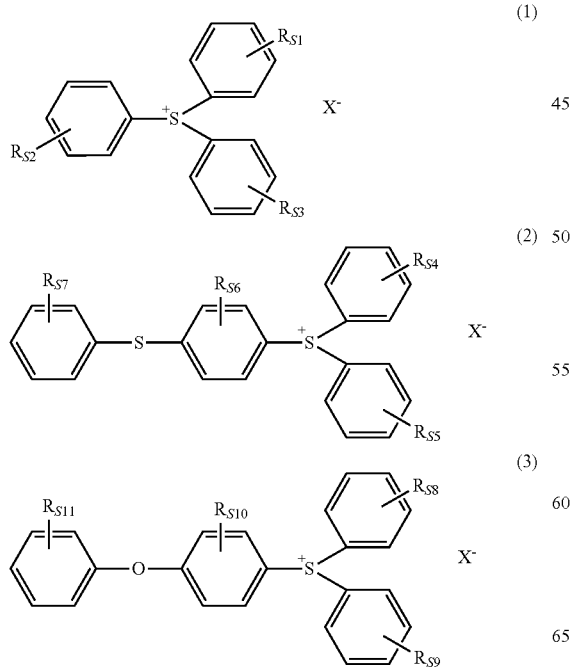

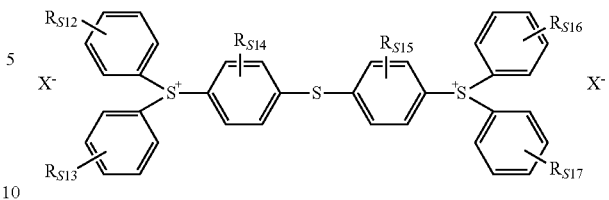

In Formulae (1) to (4), $R_{S1}$ to $R_{S17}$ each independently represent a hydrogen atom or a substituent; and $X^-$ represents an anion.

Examples of the anion represented by $X^-$ include a halide ion (e.g., $F^-$, $Cl^-$, $Br^-$, or $I^-$), $B(C_6F_5)^-$, $R_{18}COO^-$, $R_{19}SO_3^-$, $SbF_6^-$, $AsF_6^-$, $PF_6^+$, and $BF_4^-$.

$R_{18}$ and $R_{19}$ each independently represent an alkyl group that may have a substituent, or a phenyl group that may have a substituent.

Examples of the substituents included in $R_{18}$ and $R_{19}$ include the substituents represented by $R_{S1}$ to $R_{S17}$, which are described below.

The anion represented by $X^-$ is preferably $B(C_6F_5)_4^-$ or $PF_6^-$.

Examples of the substituents represented by $R_{S1}$ to $R_{S17}$ include:
alkyl groups having 1 to 12 carbon atoms, such as a methyl group, an ethyl group, a propyl group, an isopropyl group, a butyl group, an isobutyl group, a t-butyl group, a pentyl group, a hexyl group, a decyl group, and a dodecyl group;
alkoxy groups having 1 to 12 carbon atoms, such as a methoxy group, an ethoxy group, a propyl group, a butoxy group, a hexyloxy group, a decyloxy group, and a dodecyloxy group;
acyl groups having 1 to 13 carbon atoms, such as a formyl group, an acetyl group, a propionyl group, a decylcarbonyl group, a dodecylcarbonyl group, and a benzoyl group;
acyloxy groups having 1 to 13 carbon atoms, such as a formyloxy group, an acetoxy group, a propionyloxy group, a decylcarbonyloxy group, a dodecylcarbonyloxy group, and a benzoyloxy group;
alkoxycarbonyl groups having 2 to 13 carbon atoms, such as a methoxycarbonyl group, an ethoxycarbonyl group, a butoxycarbonyl group, a hexyloxycarbonyl group, a decyloxycarbonyl group, and a dodecyloxycarbonyl group;
hydrocarbon thio groups having 1 to 12 carbon atoms, such as a methylthio group, an ethylthio group, a propylthio group, an isopropylthio group, a butylthio group, an isobutylthio group, a t-butylthio group, a pentylthio group, a hexylthio group, a decylthio group, a dodecylthio group, and a phenylthio group;
halogen atoms, such as a fluorine atom, a chlorine atom, a bromine atom, and an iodine atom;
a cyano group;
a nitro group; and
a hydroxyl group.

Examples of the substituents represented by $R_{S1}$ to $R_{S17}$ also include groups formed by further substituting the groups described above as specific examples with the groups described above as specific examples.

As an organic sulfonium salt, for example, the compounds described in Paragraphs [0012] to [0017] and [0039] to [0048] of JP2006-152064A may be used.

The organic sulfonium salt can be readily synthesized by a method known in the related art, similarly to the photoacid generator described in THE CHEMICAL SOCIETY OF JAPAN Vol. 71 No. 11, 1998, Organic electronics material seminar, "Organic material for imaging", Bun-shin publishing house (1993).

The organic sulfonium salt may be a commercial product. Examples of commercial organic sulfonium salts include:
CPI-100P, CPI-101A, CPI-110P (structural formula and ClogP are described below), CPI-200K, CPI-210S, CPI-310B, CPI-410S, and IK-I (the above are produced by San-Apro Ltd.);
Omnicat 250 and Omnicat 270 (the above are produced by IGM Resins B.V.);
Irgacure 290 (structural formula and ClogP are described below) and Irgacure PAG103 (the above are produced by BASF SE); and
TS-91 and TS-01 (the above are produced by Nippon Carbide Industries Co., Inc.).

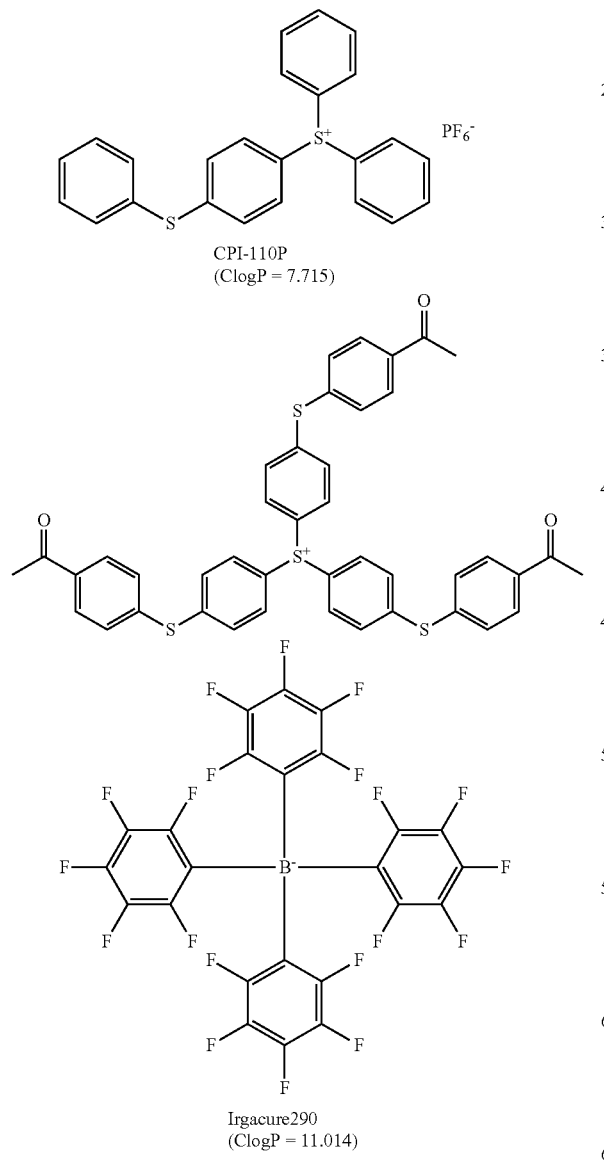

Organic Iodonium Salt

The organic iodonium salt is preferably an organic iodonium salt that includes at least one structure consisting of one $I^+$ and two aromatic rings bonded thereto.

The organic iodonium salt is more preferably the compound represented by Formula (I-1) below.

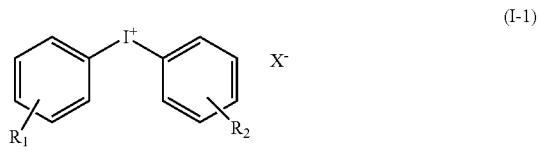

(I-1)

In Formula (I-1), $R_1$ and $R_2$ each independently represent a hydrogen atom or a substituent and $X^-$ represents an anion.

Specific examples of the substituents represented by $R_1$ and $R_2$ in Formula (I-1) are the same as the specific examples of the substituents represented by $R_{S1}$ to $R_{S17}$ in Formulae (1) to (4).

Specific examples of the anion represented by $X^-$ in Formula (I-1) are the same as the specific examples of the anion represented by $X^-$ in Formulae (1) to (4).

The organic iodonium salt may be a commercial product.

Examples of commercial organic iodonium salts include:
Omnicat 440 (produced by IGM Resins B.V.) (structural formula and ClogP are described below); and
Irgacure 250 (produced by BASF SE) (structural formula and ClogP are described below).

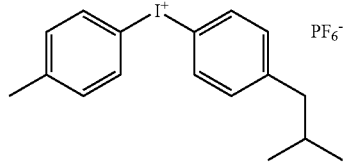

Irgacure250
(ClogP = 5.641)

Organic Phosphonium Salt

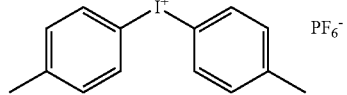

Omnicat440
(ClogP = 4.184)

Examples of the organic phosphonium salt include common organic phosphonium salts known in the related art, which are described in, for example, Paragraphs [0046] to [0049] of JP2006-297907A and Paragraphs [0025] to [0045] of JP2007-50660A.

The organic phosphonium salt is preferably an organic phosphonium salt that includes at least one structure consisting of one $P^+$ and three aromatic rings and/or hetero rings in total which are bonded to the $P^+$.

The organic phosphonium salt is more preferably the compound represented by Formula (P1) or (P2) below.

(P1)

Ar₁
|
Ar₂—P⁺—R₁     X⁻
|
Ar₃

(P2)

Ar₁           Ar₆
|    X⁻       |    X⁻
Ar₂—P⁺—L—P⁺—Ar₅
|             |
Ar₃           Ar₄

In Formula (P1), $Ar_1$ to $Ar_3$ each independently represent an aryl group or a heterocyclic group; $R_1$ represents an alkyl group; and $X^-$ represents an anion.

In Formula (P2), $Ar_1$ to $Ar_6$ each independently represent an aryl group or a heterocyclic group; L represents a divalent linking group; and two $X^-$'s each independently represent an anion.

Examples of the aryl groups represented by $Ar_1$ to $Ar_3$ in Formula (P1) include a phenyl group, a naphthyl group, a tolyl group, a xylyl group, a fluorophenyl group, a chlorophenyl group, a bromophenyl group, a methoxyphenyl group, an ethoxyphenyl group, a dimethoxyphenyl group, a methoxycarbonylphenyl group, and a dimethylaminophenyl group.

Examples of the heterocyclic groups represented by $Ar_1$ to $Ar_3$ in Formula (P1) include a pyridyl group, a quinolyl group, a pyrimidinyl group, a thienyl group, and a furyl group.

In Formula (P1), $Ar_1$ to $Ar_3$ preferably each independently represent an aryl group.

The number of carbon atoms included in the alkyl group represented by $R_1$ in Formula (P1) is preferably 1 to 30, is more preferably 4 to 30, is further preferably 6 to 25, and is further preferably 10 to 20.

Specific examples of the anion represented by $X^-$ in Formula (P1) are the same as the specific examples of the anion represented by $X^-$ in Formulae (1) to (4).

Specific examples of the aryl or heterocyclic groups represented by $Ar_1$ to $Ar_6$ in Formula (P2) are the same as the specific examples of the aryl or heterocyclic groups represented by $Ar_1$ to $Ar_3$ in Formula (P1).

Specific examples of the anion represented by $X^-$ in Formula (P2) are the same as the specific examples of the anion represented by $X^-$ in Formulae (1) to (4).

The linking group represented by L in Formula (P2) is preferably a divalent hydrocarbon group and is more preferably an alkylene group.

The number of carbon atoms included in the divalent hydrocarbon group (preferably, alkylene group) is preferably 1 to 30, is more preferably 2 to 20, and is further preferably 6 to 15.

Specific examples of the organic phosphonium group are described below. The organic phosphonium group is not limited to the following specific examples.

The compound P1-1 may be, for example, a compound produced by Tokyo Chemical Industry Co., Ltd.

The compound P2-1 may be, for example, a compound produced by Aldrich.

(P1-1)

(ClogP = 13.01)

(P2-1)

(ClogP = 15.275)

Organic Ammonium Salt

Examples of the organic ammonium salt include common organic ammonium salts known in the related art, which are described in, for example, Paragraphs [0022] to [0037] of JP2008-284858A.

The organic ammonium salt is preferably an organic ammonium salt having 6 to 100 carbon atoms in total, is more preferably an organic ammonium salt having 10 to 80 carbon atoms in total, and is further preferably an organic ammonium salt having 10 to 50 carbon atoms in total.

The organic ammonium salt is preferably a quaternary organic ammonium salt.

Examples of the organic ammonium salt include the compound represented by Formula (A1) below.

(A1)

$R_2$
|      $X^-$
$R_1$—$N^+$—$R_3$
|
$R_4$

In Formula (A1),
$R_1$ represents an alkyl group, an aryl group, an aralkyl group, or a heterocyclic group;
$R_2$ to $R_4$ each independently represent an alkyl group, an aryl group, an aralkyl group, a heterocyclic group, or a hydrogen atom; and
$X^-$ represents an anion.

At least two of $R_1$ to $R_4$ may be bonded to each other to form a ring.

Specific examples of the anion represented by $X^-$ in Formula (A1) are the same as the specific examples of the anion represented by $X^-$ in Formulae (1) to (4).

The total number of carbon atoms included in each of $R_1$ to $R_4$ in Formula (A1) is preferably 6 to 100, is more preferably 10 to 80, and is further preferably 10 to 50.

In Formula (A1), it is preferable that $R_2$ to $R_4$ each independently represent an alkyl group, an aryl group, an aralkyl group, or a heterocyclic group (i.e., the compound represented by Formula (A1) be a quaternary ammonium salt).

The alkyl group, the aryl group, the aralkyl group, and the heterocyclic group represented by $R_1$ to $R_4$ may each have a substituent.

Examples of the substituent include a hydroxyl group, an alkoxy group, an alkylthio group, and a halogen atom.

The alkyl groups represented by $R_1$ to $R_4$ in Formula (A1) are preferably chain alkyl groups having 1 to 30 carbon atoms or cycloalkyl groups having 3 to 7 carbon atoms, are more preferably chain alkyl groups having 1 to 30 carbon atoms, and are further preferably chain alkyl groups having 1 to 24 carbon atoms.

Specific examples of the aryl groups and heterocyclic groups represented by $R_1$ to $R_4$ in Formula (A1) are the same as the specific examples of the aryl groups and heterocyclic groups represented by $Ar_1$ to $Ar_3$ in Formula (P1).

Examples of the aralkyl group in Formula (A1) include a group having a structure consisting of one of the specific examples of the aryl groups represented by $Ar_1$ to $Ar_3$ in Formula (P1) and an alkylene group having 1 to 30 (preferably, 1 to 24) carbon atoms which is bonded to the aryl group.

It is preferable that at least one (preferably, one or two) of $R_1$ to $R_4$ in Formula (A1) represent a chain alkyl group (preferably, linear alkyl group) having 6 to 30 (preferably, 10 to 30, and more preferably, 10 to 25) carbon atoms.

Specific examples of the organic ammonium group are described below. The organic ammonium group is not limited to the following specific examples.

The compound A1-1 may be, for example, a compound produced by Tokyo Chemical Industry Co., Ltd.

The compound A1-2 may be, for example, a compound produced by FUJIFILM Wako Pure Chemical Corporation.

When the mass ratio [Organic onium salt/Radical polymerization inhibitor] is 0.10 or more, the releasability and discharge performance of the ink are further enhanced.

When the mass ratio [Organic onium salt/Radical polymerization inhibitor] is 300 or less, the curability and discharge performance of the ink are further enhanced.

In order to further enhance the releasability and discharge performance of the ink, the mass ratio [Organic onium salt/Radical polymerization inhibitor] is preferably 0.20 or more, is more preferably 0.30 or more, is more preferably 0.40 or more, and is further preferably 0.50 or more.

In the case where the mass ratio [Organic onium salt/Radical polymerization inhibitor] is less than 1, the mass ratio is calculated to the second decimal place. In the case where the mass ratio is 1 or more and less than 100, the mass ratio is calculated to the first decimal place. In the case where the mass ratio is 100 or more, the mass ratio is calculated as an integer.

The mass ratio of the content of the organic onium salt to the content of the pigment dispersing resin (hereinafter, this mass ratio is also referred to as "mass ratio [Organic onium salt/Pigment dispersing resin]") is preferably 0.01 or more, is more preferably 0.02 or more, is further preferably 0.05 or more, and is further preferably 0.10 or more in order to further enhance the releasability and discharge performance of the ink.

The mass ratio [Organic onium salt/Pigment dispersing resin] is preferably 17.0 or less, is more preferably 12.0 or less, is further preferably 8.0 or less, and is further preferably 6.0 or less in order to further enhance the curability and discharge performance of the ink.

A1-1

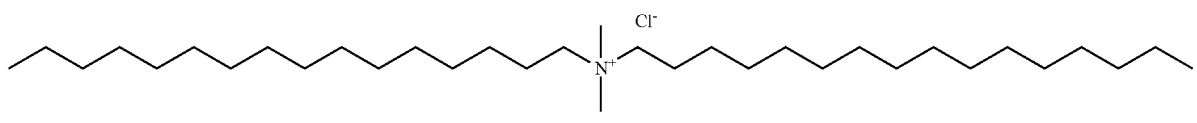

(ClogP = 10.614)

A1-2

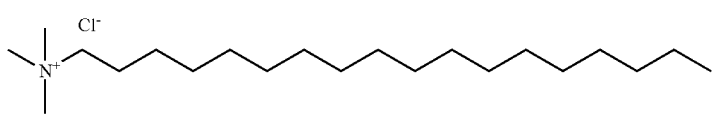

(ClogP = 3.737)

The content of the organic onium salt described above is preferably, but not limited to, 0.01% to 15.0% by mass, is more preferably 0.01% to 10.0% by mass, is further preferably 0.01% to 8.0% by mass, is further preferably 0.05% to 8.0% by mass, and is further preferably 0.05% to 6.0% by mass of the total amount of the ink.

When the content of the organic onium salt is 0.01% by mass or more, the releasability and discharge performance of the ink are further enhanced.

When the content of the organic onium salt is 15.0% by mass or less, the curability and discharge performance of the ink are further enhanced.

The mass ratio of the content of the organic onium salt to the content of the radical polymerization inhibitor (hereinafter, this mass ratio is also referred to as "mass ratio [Organic onium salt/Radical polymerization inhibitor]") is preferably 0.10 to 300, is more preferably 0.10 to 200, is further preferably 0.10 to 150, and is further preferably 0.30 to 100 or less.

In the case where the mass ratio [Organic onium salt/Pigment dispersing resin] is less than 1, the mass ratio is calculated to the second decimal place. In the case where the mass ratio is 1 or more, the mass ratio is calculated to the first decimal place.

Radical Polymerization Inhibitor

The ink according to the present disclosure includes at least one radical polymerization inhibitor.

The content of the radical polymerization inhibitor is 0.05% to 5.0% by mass of the total amount of the ink.

When the content of the radical polymerization inhibitor is 0.05% by mass or more, the phenomenon in which an ink that remains on the surface of the liquid repelling film adheres to the liquid repelling film due to leaked light that is an active energy ray is reduced and, as a result, the discharge performance of the ink is enhanced.

When the content of the radical polymerization inhibitor is 5.0% by mass or less, the curability of the ink is maintained at a suitable level.

When the content of the radical polymerization inhibitor is 5.0% by mass or less, furthermore, the likelihood of the viscosity of the ink being excessively high is reduced and, as a result, the discharge performance of the ink is maintained at a suitable level.

In order to produce the above-described advantageous effects with further effect, the content of the radical polymerization inhibitor is preferably 0.1% to 2.0% by mass and is more preferably 0.1% to 1.0% by mass of the total amount of the ink.

Examples of the radical polymerization inhibitor include:
a nitroso aluminum compound;
a quinone compound;
a nitroxyl radical compound;
a phenolic compound;
a alkylbisphenol compound;
a phenothiazine compound;
a catechol compound;
a dimethylthiocarbamic acid salt;
a salicylic acid salt;
a thiodipropionic acid ester;
a mercaptobenzimidazole compound; and
a phosphite compound.

Examples of the nitroso aluminum compound include tris(N-nitroso-N-phenylhydroxylamine) aluminum salt.

Examples of the quinone compound include hydroquinone, benzoquinone, methoxybenzoquinone, and 2,6-bis(1,1-dimethylethyl)-4-(phenylmethylene)-2,5-cyclohexadine-1-one.

Examples of the nitroxyl radical compound include 2,2,6,6-tetramethylpiperidine 1-oxyl (TEMPO) and 4-hydroxy-2,2,6,6-tetramethylpiperidine 1-oxyl (OH-TEMPO).

Examples of the phenolic compound include 4-methoxyphenol (MEHQ) and dibutyl hydroxy toluene (BHT).

The radical polymerization inhibitor preferably includes at least one selected from the group consisting of a nitroso aluminum compound, a quinone compound, and a nitroxyl radical compound and is more preferably composed of at least one selected from the group consisting of a nitroso aluminum compound, a quinone compound, and a nitroxyl radical compound in order to further enhance the discharge performance of the ink.

Radical Sensitizer

The ink according to the present disclosure preferably includes at least one radical sensitizer in order to further enhance the abrasion resistance of the image.

Examples of the radical sensitizer include:
benzophenone radical sensitizers, such as benzophenone, methyl o-benzoylbenzoate-4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl) benzophenone, and 3,3'-dimethyl-4-methoxybenzophenone; and
thioxanthone radical sensitizers, such as thioxanthone, 2-isopropylthioxanthone, 2-chlorothioxanthone, 2,4-dichlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(methoxyethoxycarbonyl)thioxanthone, 4-butoxycarbonylthioxanthone, 3-butoxycarbonyl-7-methylthioxanthone, 1-cyclo-3-chloroxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfuryl-thioxanthone, 3,4-di[2-(methoxyethoxy) ethoxycarbonyl)]thioxanthone], 1-ethoxycarbonyl-3-(1-methyl-1-morpholinoethyl)thioxanthone], 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, N-allylthioxanthone-3,4-dicarboxyimide, N-octylthioxanthone-3,4-dicarboxyimide, N-(1,1,3,3-tetramethylbutyl)-thioxanthone-3,4-dicarboxyimide, 1-phenoxythioxanthone, 6-ethoxycarbonyl-1-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propanaminium chloride, n-dodecyl-7-methyl-thioxanthone-3-carboxylate, and N,N-diisobutyl-7-methyl-thioxanthone-3-carbamide.

The above specific examples are useful as a low-molecular-weight radical sensitizer.

The term "low-molecular-weight radical sensitizer" used herein refers to a sensitizer having a molecular weight of less than 500.

The radical sensitizer may include a high-molecular-weight radical sensitizer.

The term "high-molecular-weight radical sensitizer" used herein refers to a sensitizer having a molecular weight of 500 to 5,000.

The molecular weight of the high-molecular-weight radical sensitizer is preferably 500 to 3,000, is more preferably 800 to 2,500, and is further preferably 900 to 2,100.

The high-molecular-weight radical sensitizer is described in, for example, Paragraphs [0035] to [0053] of JP2014-162828A.

Examples of commercial high-molecular-weight radical sensitizers include:
"Speedcure (registered trademark) 7010" produced by Lambson (1,3-di({α-[1-chloro-9-oxo-9H-thioxanthen-4-yl]oxy}acetylpoly[oxy(1-methylethylene)]oxy)-2,2-bis({α-[1-chloro-9-oxo-9H-thioxanthen-4-yl]oxy}acetylpoly[oxy(1-methylethylene)]oxymethyl) propane, CAS No. 1003567-83-6);
"OMNIPOL (registered trademark) TX" produced by IGM Resins B.V. (polybutyleneglycol bis(9-oxo-9H-thioxanthenyloxy)acetate, CAS No. 813452-37-8);
"OMNIPOL BP" produced by IGM Resins B.V. (polybutyleneglycol bis(4-benzoylphenoxy)acetate, CAS No. 515136-48-8); and
"Genopo TX-2" produced by Ran A.G.

In the case where the ink according to the present disclosure includes the radical sensitizer, the content of the radical sensitizer is preferably 0.1% to 15.0% by mass, is more preferably 0.5% to 10.0% by mass, and is further preferably 1.0% to 5.0% by mass of the total amount of the ink.

Cation Sensitizer

The ink according to the present disclosure may include at least one cation sensitizer.

The cation sensitizer is preferably a compound including an anthracene skeleton.

The compound including an anthracene skeleton is
preferably a compound including an anthracene skeleton and alkoxy groups having 1 to 10 (preferably 1 to 6) carbon atoms which are bonded to the 9- and 10-positions of the anthracene skeleton or a compound including an anthracene skeleton and acyloxy groups having 1 to 20 (preferably 1 to 10) carbon atoms which are bonded to the 9- and 10-positions of the anthracene skeleton, and
more preferably 9,10-diethoxyanthracene, 9,10-dibutoxyanthracene, or 9,10-di(capryloyloxy)anthracene.

The cation sensitizer may be a commercial product.

Examples of the commercial product include:
ANTHRACURE UVS1331 (produced by Kawasaki Kasei Chemicals), which is a commercial product of 9,10-dibutoxyanthracene;
ANTHRACURE UVS1101, which is a commercial product of 9,10-diethoxyanthracene; and
ANTHRACURE UVS581, which is a commercial product of 9,10-di(capryloyloxy)anthracene.

In the case where the ink according to the present disclosure includes the cation sensitizer, the content of the cation sensitizer is preferably 0.2% to 10.0% by mass, is more preferably 0.5% to 5.0% by mass, and is further preferably 0.5% to 4.0% by mass of the total amount of the ink.

Gelling Agent

The ink according to the present disclosure may include at least one gelling agent.

Examples of the gelling agent that can be included in the ink according to the present disclosure include gelling agents known in the related art, which are described in, for example, Paragraphs [0018] to [0032] of WO2015/133605.

The gelling agent that can be included in the ink according to the present disclosure is preferably at least one selected from the group consisting of an ester compound including a chain alkyl group having 12 or more carbon atoms and a ketone compound including a chain alkyl group having 12 or more carbon atoms.

The ester compound including a chain alkyl group having 12 or more carbon atoms is preferably the ester compound represented by Formula (G1) below.

The ketone compound including a chain alkyl group having 12 or more carbon atoms is preferably the ketone compound represented by Formula (G2) below.

$$R^1\text{—COO—}R^2 \quad (G1)$$

$$R^3\text{—CO—}R^4 \quad (G2)$$

In Formulae (G1) and (G2), $R^1$ to $R^4$ each independently represent a chain alkyl group having 12 or more carbon atoms.

The alkyl groups represented by $R^1$ to $R^4$ may include a branched portion.

The number of the carbon atoms included in each of the alkyl groups represented by $R^1$ to $R^4$ is preferably 12 to 26.

The melting point of the gelling agent is preferably 40° C. to 90° C., is more preferably 50° C. to 80° C., and is further preferably 60° C. to 80° C.

In the case where the ink according to the present disclosure includes the gelling agent, the content of the gelling agent is preferably 0.1% to 5.0% by mass, is more preferably 0.1% to 4.0% by mass, and is further preferably 0.5% to 2.5% by mass of the total amount of the ink.

Surfactant

The ink according to the present disclosure may include a surfactant but does not necessarily include a surfactant substantially.

Specifically, the content of the surfactant in the ink according to the present disclosure may be 0.01% by mass or less, may be 0.0001% by mass or less, and may be 0% by mass of the total amount of the ink.

Organic Solvent

The ink according to the present disclosure may contain a trace amount of organic solvent such that the above-described advantageous effects are not impaired.

However, it is preferable that the ink according to the present disclosure do not include an organic solvent or, when the ink includes an organic solvent, the content of the organic solvent be minimized in order to reduce negative impacts to recording media.

In order to further reduce negative impacts to recording media, the content of the organic solvent in the ink is preferably less than 5% by mass, is more preferably less than 3% by mass, and is further preferably less than 1% by mass of the total amount of the ink.

Water

The ink according to the present disclosure may include a trace amount of water such that the above-described advantageous effects are not impaired.

However, it is preferable that the ink according to the present disclosure do not include water or, when the ink includes water, the content of water be minimized in order to achieve the above-described advantageous effects with further effect.

The content of water in the ink is preferably less than 5% by mass, is more preferably less than 3% by mass, and is further preferably less than 1% by mass of the total amount of the ink.

Other Constituent

The ink according to the present disclosure may include a constituent other than any of the above-described constituents.

Examples of the other constituent include an antimicrobial agent and a matting agent.

Ink Jet Ink

The ink according to the present disclosure is preferably an ink jet ink.

In the case where the ink according to the present disclosure is an ink jet ink, the preferable physical properties of the ink are as described below.

The surface tension of the ink according to the present disclosure (specifically, at 25° C.) is preferably 20 to 50 mN/m and is more preferably 28 to 50 mN/m.

When the surface tension of the ink is 20 mN/m or more, the ink discharge performance is further enhanced.

When the surface tension of the ink is 50 mN/m or less, the quality of the image is further enhanced.

The viscosity of the ink according to the present disclosure at 25° C. is preferably 10 to 50 mPa·s, is more preferably 10 to 30 mPa·s, and is further preferably 10 to 25 mPa·s. The viscosity of the ink can be adjusted by, for example, changing the compositional ratio of the constituents of the ink.

The term "viscosity" used herein refers to a value measured with a viscometer. Examples of the viscometer include "VISCOMETER RE-85L" produced by Toki Sangyo Co., Ltd.

When the viscosity of the ink falls within the above preferable range, discharge stability can be further enhanced.

Image Recording Method

An image recording method according to the present disclosure includes a step of applying the above-described ink according to the present disclosure to a recording medium to form an ink film, by ejecting the ink from an ink jet head including a liquid repelling film disposed on the nozzle surface (hereinafter, this step is also referred to as "first application step") and a step of irradiating the ink film with an active energy ray (hereinafter, this step is also referred to as "first irradiation step").

The image recording method according to the present disclosure may further include another step as needed.

As described above, in the image recording method according to the present disclosure, the ink according to the present disclosure is used. Therefore, the image recording method according to the present disclosure may produce the same advantages effects as the ink according to the present disclosure.

First Application Step

In the first application step, the above-described ink according to the present disclosure is applied to a recording medium to form an ink film, by ejecting the ink from an ink jet head including a liquid repelling film disposed on the nozzle surface.

Recording Medium

A recording medium used in the image recording method according to the present disclosure is not limited.

Examples of the recording medium include a paper sheet; a paper sheet laminated with a plastic, such as polyethylene, polypropylene, or polystyrene; a metal sheet (e.g., a sheet made of a metal, such as aluminum, zinc, or copper); a plastic film (e.g., a film made of a plastic, such as a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, or an acrylic resin); a paper sheet on which a film made of any of the above metals is formed by lamination or vapor deposition; and a plastic film on which a film made of any of the above metals is formed by lamination or vapor deposition.

Ink Jet Head Including Liquid Repelling Film Disposed on Nozzle Surface

An ink jet head including a liquid repelling film disposed on the nozzle surface is described in known documents, such as JP5775485B.

The liquid repelling film disposed on the nozzle surface of the ink jet head preferably includes a fluorine compound, more preferably includes a compound including a fluoroalkyl group, and further preferably includes a perfluoroalkyl ether.

The thickness of the liquid repelling film is preferably, but not limited to, 0.2 to 30 nm and is more preferably 0.4 to 20 nm.

The ink jet head including a liquid repelling film disposed on the nozzle surface may be a commercial product.

Examples of the commercial product include:

an ink jet head "KM1800i" produced by Konica Minolta, Inc.;

an ink jet head "KJ4A-AA" produced by KYOCERA Corporation; and an ink jet head "Samba G3L" produced by FUJIFILM Corporation.

The releasability of the ink from the liquid repelling film disposed on the nozzle surface can be determined by, for example, measuring the sliding down angle of 20 pL of the ink according to the present disclosure on the surface of the liquid repelling film disposed on the nozzle surface (hereinafter, this angle is also referred to simply as "sliding down angle of the ink").

The sliding down angle of the ink is the tilt angle of the surface of the liquid repelling film with respect to a horizontal surface and expressed as an angle ranging from 0° to 90°. The sliding down angle of the ink means the minimum tilt angle necessary for 20 pL of the ink to slide down from the surface of the liquid repelling film.

The smaller the sliding down angle of the ink, the higher the releasability of the ink from the liquid repelling film disposed on the nozzle surface.

The sliding down angle of the ink is measured using a contact angle meter, such as a contact angle meter "DMs-401" produced by Kyowa Interface Science Co., LTD.

In consideration of the releasability of the ink, the sliding down angle of the ink is preferably 600 or less, is more preferably 500 or less, is further preferably 400 or less, and is further preferably 300 or less.

Ink Jet Recording Apparatus

The first application step can be conducted using an ink jet recording apparatus that includes the above-described ink jet head including a liquid repelling film disposed on the nozzle surface.

Examples of the ink jet recording apparatus include an apparatus that includes an ink feed system, a temperature sensor, and a heating unit.

The ink feed system is constituted by, for example, a source tank that accommodates an ink, a feed pipe, an ink feed tank disposed immediately before an ink jet head, a filter, and a piezoelectric ink jet head.

In this example, the above-described ink jet head including a liquid repelling film disposed on the nozzle surface is used as a piezoelectric ink jet head.

The piezoelectric ink jet head can be driven to discharge multi-size dots preferably having a volume of 1 to 100 pL and more preferably having a volume of 1 to 60 pL preferably at a resolution of 320 dpi×320 dpi (dot per inch) to 4,000 dpi×4,000 dpi (dot per inch), more preferably at 400 dpi×400 dpi to 1,600 dpi×1,600 dpi, and further preferably at 720 dpi×720 dpi to 1,600 dpi×1,600 dpi.

Note that "dpi" refers to the number of dots per inch (2.54 cm).

The volume of one droplet discharged from each of the nozzles of the ink jet head varies depending on the intended image resolution and is preferably 0.5 to 10 pL and is more preferably 0.5 to 2.5 pL in order to form a high-definition image.

The ink application system used in the ink jet method may be either a single pass system or a scan system and is preferably a single pass system in consideration of the speed at which an image is recorded.

Note that a single pass system is a system in which a line head including nozzles arranged to cover the entirety of a side of a recording medium is used as an ink jet head and fixed in position and, while the recording medium is transported in a direction perpendicular to the direction in which the nozzles of the line head are arranged, an ink is applied to the recording medium.

A scan system is a system in which a short serial head is used as an ink jet head and an ink is applied to a recording medium with the short serial head being driven to scan the recording medium.

The speed at which the recording medium is transported is preferably 1 to 120 m/s and is more preferably 50 m/s to 120 m/min.

Note that the preferable range of the speed at which a recording medium is transported in the second or later step is the same as the preferable range of the speed at which a recording medium is transported in the first step.

In the image recording method according to the present disclosure, the speed at which a recording medium is transported may be set to constant throughout all the steps or may be changed in at least some of the steps.

First Irradiation Step

In the first irradiation step, the ink film formed in the first application step is irradiated with an active energy ray.

In the first irradiation step, the irradiation of the ink film with an active energy ray causes at least a part of the radical polymerizable monomers included in the ink film to polymerize and thereby forms an image.

In the case where only a part of the radical polymerizable monomers included in the ink film is polymerized in the first irradiation step, the amount of irradiation energy of the active energy ray is reduced compared with the case where substantially the entirety of the radical polymerizable monomers included in the ink film is polymerized.

In the present disclosure, polymerizing only a part of the radical polymerizable monomers included in the ink film is referred to as "partial curing", and irradiating the ink film with an active energy ray to perform partial curing is referred to as "pinning exposure".

In the present disclosure, polymerizing substantially the entirety of the radical polymerizable monomers included in the ink film is referred to as "full curing", and irradiating the ink film with an active energy ray to perform full curing is referred to as "full exposure".

The first irradiation step may be
 a step of performing pinning exposure (i.e., partial curing) of the ink film,
 a step of performing full exposure (i.e., full curing) of the ink film, or
 a step of performing pinning exposure of the ink film and subsequently performing full exposure of the ink film.

In the case where the first irradiation step is a step of performing pinning exposure (i.e., partial curing) of the ink film, an image that is a partially cured ink film is formed in the first irradiation step.

In the case where the first irradiation step is a step of performing full exposure (i.e., full curing) of the ink film or a step of performing pinning exposure and full exposure of the ink film in this order, an image that is a fully cured ink film is formed in the first irradiation step.

In the case where the first irradiation step is a step of performing pinning exposure (i.e., partial curing) of the ink film, the image recording method preferably includes the second application step and second irradiation step described below.

The reaction rate of the ink film subsequent to the pinning exposure (i.e., partial curing) is preferably 10% to 80%.

Note that the term "reaction rate" of the ink film used herein refers to the rate of polymerization of the radical polymerizable monomers included in the ink film which is determined by high-performance liquid chromatography.

When the reaction rate of the ink film is 10% or more, the possibility of dots of the ink that is to be applied to the ink film (e.g., the second ink described below) failing to spread to a sufficient degree is reduced and, consequently, the final image (e.g., the secondary or higher color image described below) may be improved in terms of graininess (i.e., the graininess of the image is reduced).

When the reaction rate of the ink film is 80% or less, the possibility of dots of the ink that is to be applied to the ink film (e.g., the second ink described below) spreading to an excessive degree is reduced and the droplet interference between the ink dots is reduced. This enhances the quality of the final image.

The reaction rate of the ink film is preferably 15% or more in order to further improve the final image in terms of graininess.

The reaction rate of the ink film is preferably 75% or less, is more preferably 50% or less, is preferably 40% or less, is more preferably 30% or less, and is further preferably 25% or less in order to further enhance the quality of the final image.

The reaction rate of the ink film subsequent to the full exposure (i.e., full curing) is preferably more than 80% and 100% or less, is more preferably 85% to 100%, and is further preferably 90% to 100%.

When the above reaction rate is more than 80%, the adhesiveness of the image is further enhanced.

The reaction rate of the ink film is determined by the following method.

A recording medium including an ink film formed thereon, the ink film having been irradiated with an active energy ray, is prepared. A sample piece having a size of 20 mm×50 mm is taken from a region of the recording medium in which the ink film is present (hereinafter, this sample piece is referred to as "irradiated sample piece"). The irradiated sample piece is immersed in 10 mL of tetrahydrofuran (THF) for 24 hours in order to prepare a solution containing an eluted ink. This solution is subjected to high-performance liquid chromatography in order to measure the amount of radical polymerizable monomers (hereinafter, this amount is referred to as "amount of monomers $X1$ after irradiation").

Subsequently, the same operation as described above is performed, except that the ink film disposed on a recording medium is not irradiated with an active energy ray and the amount of radical polymerizable monomers is measured (hereinafter, this amount is referred to as "amount of monomers $X1$ before irradiation").

The ink reaction rate (%) is calculated using the following formula on the basis of the amount of monomers $X1$ after irradiation and the amount of monomers $X1$ before irradiation.

$$\text{Ink reaction rate (\%)} = ((\text{Amount of monomers } X1 \text{ before irradiation} - \text{Amount of monomers } X1 \text{ after irradiation})/\text{Amount of monomers } X1 \text{ before irradiation}) \times 100$$

The active energy ray used in the irradiation step (i.e., the active energy ray used for pinning exposure and/or full exposure; the same applies hereinafter) is preferably ultraviolet (UV) light and is more preferably UV light having a maximum illuminance at wavelengths of 385 to 410 nm.

A common UV light source known in the related art which is capable of changing at least one of illuminance or irradiation time can be used as a UV light source (i.e., source of UV light).

The UV light source is preferably a light-emitting diode (LED) light source.

The irradiation with an active energy ray in the irradiation step may be performed in an environment having an oxygen concentration of 20% by volume or less (more preferably less than 20% by volume and further preferably 5% by volume or less). In such a case, the possibility of the polymerization reaction being inhibited by oxygen is reduced and, consequently, an image having further high adhesiveness to recording media and high inside curability can be formed.

The environment having an oxygen concentration of less than 20% by volume is preferably an atmosphere containing an inert gas, such as a nitrogen gas, an argon gas, or a helium gas.

The illuminance of the active energy ray used for the pinning exposure is preferably 0.10 to 0.50 W/cm, is more preferably 0.20 to 0.49 W/cm, and is further preferably 0.20 to 0.45 W/cm in order to achieve the above-described ink reaction rate with further ease.

The amount of irradiation energy of the active energy ray used for the pinning exposure (hereinafter, this amount is also referred to as "amount of exposure") is preferably 2 to 20 mJ/cm$^2$ and is more preferably 4 to 15 mJ/cm$^2$ in order to achieve the above-described ink reaction rate with further ease.

The illuminance of the active energy ray used for the full exposure is preferably 1.0 W/cm or more, is more preferably 2.0 W/cm or more, and is further preferably 4.0 W/cm or more in order to further enhance the adhesiveness of the image to a recording medium.

The upper limit for the illuminance of the active energy ray used for the full exposure is not set and is, for example, 10 W/cm.

The amount of irradiation energy of the active energy ray used for the full exposure (hereinafter, this amount is also referred to as "amount of exposure") is preferably 20 mJ/cm$^2$ or more and is more preferably 80 mJ/cm$^2$ or more in order to further enhance the adhesiveness of the image to a recording medium.

The upper limit for the amount of irradiation energy of the active energy ray used for the full exposure is not set and is, for example, 240 mJ/cm$^2$.

Second Application Step

The image recording method according to the present disclosure may include a second application step of applying a second ink to the ink film that has been irradiated with an active energy ray in the first irradiation step (hereinafter, also referred to as "first ink film") to form a second ink film in contact with the first ink film.

It is preferable that, in the second application step, the second ink be applied to the first ink film to form a second ink film, by ejecting the second ink from an ink jet head including a liquid repelling film disposed on the nozzle surface.

In such a case, not only the discharge performance of the first ink but also the discharge performance of the second ink can be enhanced.

The ink jet head including a liquid repelling film disposed on the nozzle surface which can be used in the second application step may be the same as the ink jet head including a liquid repelling film disposed on the nozzle surface which can be used in the first application step.

In order to further enhance the releasability of the second ink from the liquid repelling film disposed on the nozzle surface which can be used in the second application step, the sliding down angle of 20 pL of the second ink on the surface of the liquid repelling film disposed on the nozzle surface which can be used in the second application step (hereinafter, this angle is also referred to simply as "sliding down angle of the second ink") is preferably less than 60°, is more preferably less than 50°, is further preferably 400 or less, is further preferably less than 40°, and is further preferably less than 30°.

The sliding down angle of the second ink can be measured by the same measuring method as the above-described sliding down angle of the ink.

The second ink is preferably an active energy ray-curable ink that includes a radical polymerizable monomer and a photopolymerization initiator and is more preferably the ink according to the present disclosure.

The number of the types of the second inks used in the second application step may be only one or two or more.

It is preferable that the ink according to the present disclosure used in the first application step (hereinafter, this ink is also referred to as "first ink") and the second ink have different hues.

In the case where the first and second inks have different hues, a secondary or higher color image (e.g., secondary color image) can be recorded.

In the second application step, the second ink may be applied to both of the first ink film and a region of a recording medium in which the first ink film is absent.

In the second application step, it is sufficient that the second ink be applied to at least a part of the first ink film; the second ink is not necessarily applied to the entirety of the first ink film.

The method for the application of the second ink is the same as the method for the application of the first ink. The same applies to the preferable aspect.

The image recording method according to an aspect of the present disclosure which includes the second application step is capable of recording a secondary or higher color image.

Second Irradiation Step

An image recording method according to an aspect of the present disclosure which includes the second application step may further include a second irradiation step of irradiating the entirety of the first and second ink films with a second active energy ray.

The second irradiation step may be
 a step of performing pinning exposure (i.e., partial curing) of the entirety of the first and second ink films,
 a step of performing full exposure (i.e., full curing) of the entirety of the first and second ink films, or
 a step of performing pinning exposure and full exposure of the entirety of the first and second ink films in this order.

The preferable aspect of the second active energy ray and the preferable conditions for irradiation with the second active energy ray are the same as the preferable aspect of the active energy ray used in the first irradiation step and the preferable conditions for irradiation with the active energy ray in the first irradiation step.

For example, the preferable irradiation conditions under which the pinning exposure and full exposure are performed in the second irradiation step are the same as the preferable irradiation conditions under which the pinning exposure and full exposure are performed in the first irradiation step.

EXAMPLES

Examples of the present disclosure are described below. Note that the present disclosure is not limited by Examples below.

Hereinafter, "parts" and "%" are on a mass basis unless otherwise specified.

Preparation of Pigment Dispersions

As pigment dispersions used for preparing inks,
 a cyan pigment dispersion (hereinafter, also referred to as "C pigment dispersion"),
 a magenta pigment dispersion (hereinafter, also referred to as "M pigment dispersion"),
 a yellow pigment dispersion (hereinafter, also referred to as "Y pigment dispersion"),
 a black pigment dispersion (hereinafter, also referred to as "K pigment dispersion"), and
 a white pigment dispersion (hereinafter, also referred to as "W pigment dispersion") were prepared.

Specifically, the constituents of each of the pigment dispersions were charged into a disperser "Motor Mill M50" produced by Eiger and dispersed using zirconia beads having a diameter of 0.65 mm at a rotation speed of 9 m/s for 8 hours to prepare a pigment dispersion.

Composition of C Pigment Dispersion
 C pigment (cyan pigment): "IRGALITE BLUE GLVO" produced by BASF SE Japan: 30 parts by mass "SR9003" produced by Sartomer (propoxylated (2) neopentyl glycol diacrylate used as a PO-modified neopentyl glycol diacrylate): 60 parts by mass
"SOLSPERSE 32000" produced by Lubrizol (amine resin dispersing agent): 10 parts by mass Composition of M Pigment Dispersion
   M pigment (magenta pigment): "CINQUASIA MAGENTA RT-355D" produced by BASF SE Japan: 30 parts by mass
   "SR9003" produced by Sartomer: 60 parts by mass
   "SOLSPERSE 32000" produced by Lubrizol: 10 parts by mass Composition of Y Pigment Dispersion
   Y pigment (yellow pigment): "NOVOPERM YELLOW H2G" produced by Clariant AG: 30 parts by mass
   "SR9003" produced by Sartomer: 60 parts by mass
   "SOLSPERSE 32000" produced by Lubrizol: 10 parts by mass Composition of K Pigment Dispersion
   K pigment (black pigment): "SPECIAL BLACK 250" produced by BASF SE Japan: 30 parts by mass
   "SR9003" produced by Sartomer: 60 parts by mass
   "SOLSPERSE 32000" produced by Lubrizol: 10 parts by mass Composition of W Pigment Dispersion
   W pigment (white pigment): "TIPAQUE CR60-2" produced by Ishihara Sangyo Kaisha, Ltd.: 30 parts by mass
   "SR9003" produced by Sartomer: 60 parts by mass
   "SOLSPERSE 32000" produced by Lubrizol: 10 parts by mass Preparation of Inks Each of the inks (i.e., cyan, magenta, yellow, black, and white inks) having the compositions described in Tables 1 to 5 was prepared by mixing the constituents described in Tables 1 to 5.

Preparation of Image Recording Apparatus

An image recording apparatus (specifically, ink jet recording apparatus) that included a transport system that transports a recording medium; and a head for black ink, an ultraviolet (UV) light source, a head for cyan ink, an UV light source, a head for magenta ink, an UV light source, a head for yellow ink, an UV light source, a head for white ink, and a nitrogen purge UV exposure machine that were arranged in order from the upstream side in the direction in which a recording medium is transported was prepared. The transport system was a single-pass transport system of a sheet-fed printing press.

Each of the head for black ink, the head for cyan ink, the head for magenta ink, and the head for yellow ink used was an ink jet head "KM1800i" produced by Konica Minolta, Inc., which was a piezoelectric ink jet head (specifically, line head) including a liquid repelling film disposed on the nozzle surface.

Each of the nozzles of the ink jet heads was capable of ejecting multi-size dots having a volume of 1 to 60 pL at a resolution of 1,200 dpi×1,200 dpi. Note that "dpi" refers to the number of dots per inch (2.54 cm).

The liquid repelling film included in each of the ink jet heads was a perfluoroalkyl ether film having a thickness of 1 to 10 nm.

The ink feed system of the ink jet recording apparatus was constituted by a source tank, feed pipes, ink feed tanks disposed immediately before the ink jet heads, filters, and the ink jet heads. In the image recording performed in Examples, a portion of the ink feed system which extended from the ink feed tank to the ink jet head was thermally insulated and heated. Furthermore, a temperature sensor was disposed in the vicinity of each of the ink feed tanks and the nozzles of the ink jet heads and a temperature control was performed such that the temperatures of the nozzle portions were always 70° C.±2° C. Note that, in the examples where an ink including a gelling agent was used, a temperature control was performed such that the temperatures of the nozzle portions were always 90° C.±2° C.

An ink having a color corresponding to each of the ink jet heads was charged into a source tank connected to the ink jet head.

The UV light source disposed immediately after each of the ink jet heads and the UV light source included in the nitrogen purge UV exposure machine were light-emitting diode (LED) lamps produced by KYOCERA Corporation (width: 4 cm, G4B, maximum illuminance: 10 W) capable of emitting UV light having a maximum illuminance at wavelengths of 385 to 410 nm.

The illuminance of UV light emitted from these UV light sources and the amount of irradiation time during which UV light was emitted from the UV light sources were changeable.

In the image recording performed in Examples, the speed at which a recording medium was transported was adjusted such that the irradiation of ink droplets discharged from the ink jet heads to the recording medium with UV light was started 0.1 seconds after the ink droplets have landed on the recording medium.

Examples 1 to 42 and Comparative Examples 1 to 3

An image was recorded using one of the inks, the image recording apparatus, and a recording medium "OK Top Coat Paper" (84.9 g/m$^2$) produced by Oji Paper Co., Ltd. in accordance with the above image recording method and evaluated in terms of the following items.

Image Recording

The ink was applied to the recording medium in a solid pattern at a dot percent of 100% using the above image recording apparatus. The ink deposited on the recording medium was irradiated with UV light having an illuminance of 0.40 W/cm$^2$ for 0.024 seconds (pinning exposure) and subsequently irradiated with UV light having an illuminance of 5.0 W/cm$^2$ for 0.024 seconds (full exposure) to form an image (specifically, a solid image).

In this evaluation, pinning exposure was performed using UV light sources disposed immediately after the respective ink jet heads in an air atmosphere having an oxygen concentration of 20%.

Full exposure was performed using a nitrogen-purge UV exposing machine in an atmosphere having an oxygen concentration of 1% and a nitrogen concentration of 99%.

Evaluations

Each of the inks was evaluated in terms of the following items.

Tables 1 to 5 list the results.

Discharge Performance of Ink

An evaluation in which the ink was continuously ejected from the ink jet head of the above-described image recording apparatus in a 1,200-dpi mode for 5 minutes and the number of the positions at which ejection failure (e.g., ejection deflection) occurred was confirmed was made.

The above evaluation was made six times. The discharge performance of the ink was evaluated on the basis of the above results in accordance with the following evaluation criteria.

In the evaluation criteria below, an example that was the most excellent in terms of the discharge performance of the ink is rated as "5".

Criteria for Evaluating Discharge Performance of Ink
5: Ejection failure did not occur in any of the six evaluations.
4: Ejection failure occurred at only one position in one evaluation, and ejection failure did not occur in five evaluations.
3: Ejection failure occurred at only one position in two evaluations, and ejection failure did not occur in four evaluations.
2: Ejection failure occurred at only one position in three evaluations, and ejection failure did not occur in three evaluations.
1: At least one of the following was satisfied: ejection failure occurred at only one position in four or more evaluations, or ejection failure occurred at two or more positions in one or more evaluations.

Releasability of Ink

The releasability of the ink from the liquid repelling film disposed on the nozzle surface of the ink jet head was determined using the ink jet head of the above-described image recording apparatus, the above-described ink, and a contact angle meter "DMs-401" produced by Kyowa Interface Science Co., LTD.

The ink jet head was arranged such that the nozzle surface (i.e., the surface of the liquid repelling film) of the ink jet head was in a horizontal position. Then, a 20-pL droplet of the above-described ink was put on the surface of the liquid repelling film disposed on the nozzle surface.

While the tilt angle of the surface of the liquid repelling film was gradually increased, the tilt angle of the surface of the liquid repelling film at which the 20-pL droplet slid down was determined as the sliding down angle of the ink.

The releasability of the ink from the liquid repelling film disposed on the nozzle surface of the ink jet head was evaluated on the basis of the sliding down angle of the ink in accordance with the following evaluation criteria.

In the evaluation criteria below, an example that was the most excellent in terms of the releasability of the ink is rated as "5".

Criteria for Evaluating Releasability of Ink
5: The sliding down angle was 300 or less.
4: The sliding down angle was more than 30° and 40° or less.
3: The sliding down angle was more than 40° and 50° or less.
2: The sliding down angle was more than 50° and 60° or less.
1: The sliding down angle was more than 60°.

Curability of Ink

A solid image having an average film thickness of 10 μm was recorded on a recording medium in accordance with the operation described in Image Recording above.

An A6-size paper sheet was put on the solid image. While a load of 1 kg/A6 size was applied to the paper sheet, holding was performed at 25° C. for 24 hours.

After a lapse of 24 hours, whether or not the image was transferred to the paper sheet was visually determined.

In the case where the image was transferred to the paper sheet, the proportion (%) of the area of the image transferred on the paper sheet to the area of the paper sheet was measured.

The curability of the ink was evaluated on the basis of the above results in accordance with the following evaluation criteria.

In the evaluation criteria below, an example that was the most excellent in terms of the curability of the ink is rated as "5".

Criteria for Evaluating Curability of Ink
5: Transfer did not occur.
4: The area of the image transferred on the paper sheet was more than 0% and 25% or less of the area of the paper sheet.
3: The area of the image transferred on the paper sheet was more than 25% and 50% or less of the area of the paper sheet.
2: The area of the image transferred on the paper sheet was more than 50% and 75% or less of the area of the paper sheet.
1: The area of the image transferred on the paper sheet was more than 75% of the area of the paper sheet.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Radical polymerizable monomer | NVC | 20.0 | 20.0 | 20.0 | 20.0 | 20.0 | 20.0 | 20.0 | 20.0 | 20.0 | 20.0 |
|  | SR506 | 32.9 | 32.9 | 32.9 | 32.9 | 32.5 | 32.1 | 28.0 | 26.0 | 23.0 | 18.0 |
|  | SR351 | 10.0 | 10.0 | 10.0 | 10.0 | 10.0 | 10.0 | 10.0 | 10.0 | 10.0 | 10.0 |
|  | SR454 | 10.0 | 10.0 | 10.0 | 10.0 | 10.0 | 10.0 | 10.0 | 10.0 | 10.0 | 10.0 |
|  | SR9003 | 10.0 | 10.0 | 10.0 | 10.0 | 10.0 | 10.0 | 10.0 | 10.0 | 10.0 | 10.0 |
|  | DVE-3 |  |  |  |  |  |  |  |  |  |  |
| Cation polymerizable monomer | CEL2021P OXT-221 |  |  |  |  |  |  |  |  |  |  |
| Radical polymerization initiator | TPO | 6.0 | 6.0 | 6.0 | 6.0 | 6.0 | 6.0 | 6.0 | 6.0 | 6.0 | 6.0 |
| Radical sensitizer | ITX | 2.0 | 2.0 | 2.0 | 2.0 | 2.0 | 2.0 | 2.0 | 2.0 | 2.0 | 2.0 |
| C pigment dispersion |  | 9.0 | 9.0 | 9.0 | 9.0 | 9.0 | 9.0 | 9.0 | 9.0 | 9.0 | 9.0 |
| M pigment dispersion |  |  |  |  |  |  |  |  |  |  |  |
| Y pigment dispersion |  |  |  |  |  |  |  |  |  |  |  |
| K pigment dispersion |  |  |  |  |  |  |  |  |  |  |  |
| W pigment dispersion |  |  |  |  |  |  |  |  |  |  |  |
| Pigment dispersing resin included in each pigment dispersion | Solsperse 32000 | 0.9 | 0.9 | 0.9 | 0.9 | 0.9 | 0.9 | 0.9 | 0.9 | 0.9 | 0.9 |

TABLE 1-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Organic onium salt | CPI-110P | 0.01 | 0.02 | 0.05 | 0.1 | 0.5 | 0.9 | 5.0 | 7.0 | 10.0 | 15.0 |
|  | Irgacure290 |  |  |  |  |  |  |  |  |  |  |
|  | Ominicat250 |  |  |  |  |  |  |  |  |  |  |
|  | Ominicat440 |  |  |  |  |  |  |  |  |  |  |
|  | P1-1 |  |  |  |  |  |  |  |  |  |  |
|  | P2-1 |  |  |  |  |  |  |  |  |  |  |
|  | A1-1 |  |  |  |  |  |  |  |  |  |  |
|  | A1-2 |  |  |  |  |  |  |  |  |  |  |
| Radical polymerization inhibitor | UV-12 (solid content) | 0.05 | 0.05 | 0.05 | 0.05 | 0.05 | 0.05 | 0.05 | 0.05 | 0.05 | 0.05 |
|  | UV-22 (solid content) |  |  |  |  |  |  |  |  |  |  |
|  | OH-TEMPO |  |  |  |  |  |  |  |  |  |  |
|  | MEHQ |  |  |  |  |  |  |  |  |  |  |
| Mass ratio [Organic onium salt/Radical polymerization inhibitor] |  | 0.20 | 0.40 | 1.0 | 2.0 | 10.0 | 18.0 | 100 | 140 | 200 | 300 |
| Mass ratio [Organic onium salt/Pigment dispersing resin] |  | 0.01 | 0.02 | 0.06 | 0.11 | 0.56 | 1.00 | 5.56 | 7.78 | 11.1 | 16.7 |
| Proportion of amount of radical polymerizable monomer to total amount of polymerizable compounds [mass %] |  | 100 | 100 | 100 | 100 | 100 | 100 | 100 | 100 | 100 | 100 |
| Discharge performance |  | 3 | 4 | 4 | 4 | 4 | 4 | 4 | 3 | 3 | 3 |
| Releasability |  | 3 | 4 | 5 | 5 | 5 | 5 | 5 | 5 | 4 | 4 |
| Curability |  | 5 | 5 | 5 | 5 | 5 | 5 | 4 | 3 | 3 | 3 |

TABLE 2

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Radical polymerizable monomer | NVC | 20.0 | 20.0 | 20.0 | 20.0 | 20.0 | 20.0 | 20.0 | 20.0 | 20.0 | 20.0 |
|  | SR506 | 32.5 | 32.5 | 32.5 | 32.4 | 32.2 | 32.0 | 31.5 | 30.5 | 27.5 | 35.4 |
|  | SR351 | 10.0 | 10.0 | 10.0 | 10.0 | 10.0 | 10.0 | 10.0 | 10.0 | 10.0 | 10.0 |
|  | SR454 | 10.0 | 10.0 | 10.0 | 10.0 | 10.0 | 10.0 | 10.0 | 10.0 | 10.0 | 10.0 |
|  | SR9003 | 10.0 | 10.0 | 10.0 | 10.0 | 10.0 | 10.0 | 10.0 | 10.0 | 10.0 | 10.0 |
|  | DVE-3 |  |  |  |  |  |  |  |  |  |  |
| Cation polymerizable monomer | CEL2021P |  |  |  |  |  |  |  |  |  |  |
|  | OXT-221 |  |  |  |  |  |  |  |  |  |  |
| Radical polymerization initiator | TPO | 6.0 | 6.0 | 6.0 | 6.0 | 6.0 | 6.0 | 6.0 | 6.0 | 6.0 | 6.0 |
| Radical sensitizer | ITX | 2.0 | 2.0 | 2.0 | 2.0 | 2.0 | 2.0 | 2.0 | 2.0 | 2.0 | 2.0 |
| C pigment dispersion |  | 9.0 | 9.0 | 9.0 | 9.0 | 9.0 | 9.0 | 9.0 | 9.0 | 9.0 | 6.0 |
| M pigment dispersion |  |  |  |  |  |  |  |  |  |  |  |
| Y pigment dispersion |  |  |  |  |  |  |  |  |  |  |  |
| K pigment dispersion |  |  |  |  |  |  |  |  |  |  |  |
| W pigment dispersion |  |  |  |  |  |  |  |  |  |  |  |
| Pigment dispersing resin included in each pigment dispersion | Solsperse 32000 | 0.9 | 0.9 | 0.9 | 0.9 | 0.9 | 0.9 | 0.9 | 0.9 | 0.9 | 0.6 |
| Organic onium salt | CPI-110P | 0.5 | 0.5 | 0.5 | 0.5 | 0.5 | 0.5 | 0.5 | 0.5 | 0.5 | 0.5 |
|  | Irgacure290 |  |  |  |  |  |  |  |  |  |  |
|  | Ominicat250 |  |  |  |  |  |  |  |  |  |  |
|  | Ominicat440 |  |  |  |  |  |  |  |  |  |  |
|  | P1-1 |  |  |  |  |  |  |  |  |  |  |
|  | P2-1 |  |  |  |  |  |  |  |  |  |  |
|  | A1-1 |  |  |  |  |  |  |  |  |  |  |
|  | A1-2 |  |  |  |  |  |  |  |  |  |  |
| Radical polymerization inhibitor | UV-12 (solid content) |  |  |  | 0.10 | 0.30 | 0.50 | 1.0 | 2.0 | 5.0 | 0.10 |
|  | UV-22 (solid content) | 0.05 |  |  |  |  |  |  |  |  |  |

TABLE 2-continued

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
|  | OH-TEMPO |  | 0.05 |  |  |  |  |  |  |  |  |
|  | MEHQ |  |  | 0.05 |  |  |  |  |  |  |  |
| Mass ratio [Organic onium salt/Radical polymerization inhibitor] |  | 10.0 | 10.0 | 10.0 | 5.0 | 1.7 | 1.0 | 0.50 | 0.25 | 0.10 | 5.0 |
| Mass ratio [Organic onium salt/Pigment dispersing resin] |  | 0.56 | 0.56 | 0.56 | 0.56 | 0.56 | 0.56 | 0.56 | 0.56 | 0.56 | 0.83 |
| Proportion of amount of radical polymerizable monomer to total amount of polymerizable compounds [mass %] |  | 100 | 100 | 100 | 100 | 100 | 100 | 100 | 100 | 100 | 100 |
| Discharge performance |  | 4 | 4 | 3 | 5 | 5 | 5 | 5 | 4 | 3 | 5 |
| Releasability |  | 5 | 5 | 5 | 5 | 5 | 5 | 5 | 4 | 3 | 5 |
| Curability |  | 5 | 5 | 5 | 5 | 5 | 5 | 4 | 4 | 3 | 5 |

TABLE 3

|  |  | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Radical polymerizable monomer | NVC | 20.0 | 20.0 | 20.0 | 20.0 | 20.0 | 20.0 | 20.0 | 20.0 | 20.0 | 20.0 |
|  | SR506 | 29.4 | 21.4 | 11.4 | 32.4 | 32.4 | 32.4 | 32.4 | 32.4 | 32.4 | 32.4 |
|  | SR351 | 10.0 | 10.0 | 10.0 | 10.0 | 10.0 | 10.0 | 10.0 | 10.0 | 10.0 | 10.0 |
|  | SR454 | 10.0 | 10.0 | 10.0 | 10.0 | 10.0 | 10.0 | 10.0 | 10.0 | 10.0 | 10.0 |
|  | SR9003 | 10.0 | 10.0 | 10.0 | 10.0 | 10.0 | 10.0 | 10.0 | 10.0 | 10.0 | 10.0 |
|  | DVE-3 |  |  |  |  |  |  |  |  |  |  |
| Cation polymerizable monomer | CEL2021P |  |  |  |  |  |  |  |  |  |  |
|  | OXT-221 |  |  |  |  |  |  |  |  |  |  |
| Radical polymerization initiator | TPO | 6.0 | 6.0 | 6.0 | 6.0 | 6.0 | 6.0 | 6.0 | 6.0 | 6.0 | 6.0 |
| Radical sensitizer | ITX | 2.0 | 2.0 | 2.0 | 2.0 | 2.0 | 2.0 | 2.0 | 2.0 | 2.0 | 2.0 |
| C pigment dispersion |  | 12.0 | 20.0 | 30.0 | 9.0 | 9.0 | 9.0 | 9.0 | 9.0 | 9.0 | 9.0 |
| M pigment dispersion |  |  |  |  |  |  |  |  |  |  |  |
| Y pigment dispersion |  |  |  |  |  |  |  |  |  |  |  |
| K pigment dispersion |  |  |  |  |  |  |  |  |  |  |  |
| W pigment dispersion |  |  |  |  |  |  |  |  |  |  |  |
| Pigment dispersing resin included in each pigment dispersion | Solsperse 32000 | 1.2 | 2.0 | 3.0 | 0.9 | 0.9 | 0.9 | 0.9 | 0.9 | 0.9 | 0.9 |
| Organic onium salt | CPI-110P | 0.5 | 0.5 | 0.5 |  |  |  |  |  |  |  |
|  | Irgacure290 |  |  |  | 0.5 |  |  |  |  |  |  |
|  | Ominicat250 |  |  |  |  | 0.5 |  |  |  |  |  |
|  | Ominicat440 |  |  |  |  |  | 0.5 |  |  |  |  |
|  | P1-1 |  |  |  |  |  |  | 0.5 |  |  |  |
|  | P2-1 |  |  |  |  |  |  |  | 0.5 |  |  |
|  | A1-1 |  |  |  |  |  |  |  |  | 0.5 |  |
|  | A1-2 |  |  |  |  |  |  |  |  |  | 0.5 |
| Radical polymerization inhibitor | UV-12 (solid content) | 0.10 | 0.10 | 0.10 | 0.10 | 0.10 | 0.10 | 0.10 | 0.10 | 0.10 | 0.10 |
|  | UV-22 (solid content) |  |  |  |  |  |  |  |  |  |  |
|  | OH-TEMPO |  |  |  |  |  |  |  |  |  |  |
|  | MEHQ |  |  |  |  |  |  |  |  |  |  |
| Mass ratio [Organic onium salt/Radical polymerization inhibitor] |  | 5.0 | 5.0 | 5.0 | 5.0 | 5.0 | 5.0 | 5.0 | 5.0 | 5.0 | 5.0 |
| Mass ratio [Organic onium salt/Pigment dispersing resin] |  | 0.42 | 0.25 | 0.17 | 0.56 | 0.56 | 0.56 | 0.56 | 0.56 | 0.56 | 0.56 |
| Proportion of amount of radical polymerizable monomer to total amount of polymerizable compounds [mass %] |  | 100 | 100 | 100 | 100 | 100 | 100 | 100 | 100 | 100 | 100 |

TABLE 3-continued

|  | Example 21 | Example 22 | Example 23 | Example 24 | Example 25 | Example 26 | Example 27 | Example 28 | Example 29 | Example 30 |
|---|---|---|---|---|---|---|---|---|---|---|
| Discharge performance | 5 | 5 | 4 | 5 | 5 | 4 | 5 | 5 | 5 | 3 |
| Releasability | 5 | 5 | 4 | 5 | 5 | 4 | 5 | 5 | 5 | 3 |
| Curability | 5 | 5 | 4 | 5 | 5 | 5 | 5 | 5 | 5 | 5 |

TABLE 4

|  |  | Example 31 | Example 32 | Example 33 | Example 34 | Example 35 | Example 36 | Example 37 | Example 38 | Example 39 | Example 40 |
|---|---|---|---|---|---|---|---|---|---|---|---|
| Radical polymerizable monomer | NVC | 20.0 | 20.0 | 20.0 | 20.0 | 20.0 | 20.0 | 20.0 | 20.0 | 20.0 | 20.0 |
|  | SR506 | 19.4 | 19.4 | 30.4 | 28.4 | 24.4 | 19.4 | 15.4 | 7.4 | 23.4 | 32.4 |
|  | SR351 | 10.0 | 10.0 | 10.0 | 10.0 | 10.0 | 10.0 | 10.0 | 10.0 | 10.0 | 10.0 |
|  | SR454 | 10.0 | 10.0 | 10.0 | 10.0 | 10.0 | 10.0 | 10.0 | 10.0 | 10.0 | 10.0 |
|  | SR9003 | 10.0 | 10.0 | 10.0 | 10.0 | 10.0 | 10.0 | 10.0 | 10.0 | 10.0 | 10.0 |
|  | DVE-3 | 13.0 |  |  |  |  |  |  |  |  |  |
| Cation polymerizable monomer | CEL2021P |  |  | 2.0 | 4.0 | 8.0 | 13.0 | 17.0 | 25.0 |  |  |
|  | OXT-221 |  | 13.0 |  |  |  |  |  |  |  |  |
| Radical polymerization initiator | TPO | 6.0 | 6.0 | 6.0 | 6.0 | 6.0 | 6.0 | 6.0 | 6.0 | 6.0 | 6.0 |
| Radical sensitizer | ITX | 2.0 | 2.0 | 2.0 | 2.0 | 2.0 | 2.0 | 2.0 | 2.0 | 2.0 | 2.0 |
| C pigment dispersion |  | 9.0 | 9.0 | 9.0 | 9.0 | 9.0 | 9.0 | 9.0 | 9.0 |  |  |
| M pigment dispersion |  |  |  |  |  |  |  |  |  | 18.0 |  |
| Y pigment dispersion |  |  |  |  |  |  |  |  |  |  | 9.0 |
| K pigment dispersion |  |  |  |  |  |  |  |  |  |  |  |
| W pigment dispersion |  |  |  |  |  |  |  |  |  |  |  |
| Pigment dispersing resin included in each pigment dispersion | Solsperse 32000 | 0.9 | 0.9 | 0.9 | 0.9 | 0.9 | 0.9 | 0.9 | 0.9 | 1.8 | 0.9 |
| Organic onium salt | CPI-110P | 0.5 | 0.5 | 0.5 | 0.5 | 0.5 | 0.5 | 0.5 | 0.5 | 0.5 | 0.5 |
|  | Irgacure290 |  |  |  |  |  |  |  |  |  |  |
|  | Ominicat250 |  |  |  |  |  |  |  |  |  |  |
|  | Ominicat440 |  |  |  |  |  |  |  |  |  |  |
|  | P1-1 |  |  |  |  |  |  |  |  |  |  |
|  | P2-1 |  |  |  |  |  |  |  |  |  |  |
|  | A1-1 |  |  |  |  |  |  |  |  |  |  |
|  | A1-2 |  |  |  |  |  |  |  |  |  |  |
| Radical polymerization inhibitor | UV-12 (solid content) | 0.10 | 0.10 | 0.10 | 0.10 | 0.10 | 0.10 | 0.10 | 0.10 |  |  |
|  | UV-22 (solid content) |  |  |  |  |  |  |  |  | 0.10 | 0.10 |
|  | OH-TEMPO |  |  |  |  |  |  |  |  |  |  |
|  | MEHQ |  |  |  |  |  |  |  |  |  |  |
| Mass ratio [Organic onium salt/Radical polymerization inhibitor] |  | 5.0 | 5.0 | 5.0 | 5.0 | 5.0 | 5.0 | 5.0 | 5.0 | 5.0 | 5.0 |
| Mass ratio [Organic onium salt/Pigment dispersing resin] |  | 0.56 | 0.56 | 0.56 | 0.56 | 0.56 | 0.56 | 0.56 | 0.56 | 0.28 | 0.56 |
| Proportion of amount of radical polymerizable monomer to total amount of polymerizable compounds [mass %] |  | 100 | 85 | 98 | 95 | 91 | 85 | 81 | 72 | 100 | 100 |
| Discharge performance |  | 5 | 4 | 5 | 5 | 4 | 4 | 4 | 3 | 5 | 5 |
| Releasability |  | 5 | 5 | 5 | 5 | 5 | 5 | 5 | 5 | 5 | 5 |
| Curability |  | 5 | 4 | 5 | 5 | 5 | 4 | 3 | 3 | 5 | 5 |

TABLE 5

|  |  | Example 41 | Example 42 | Comparative example 1 | Comparative example 2 | Comparative example 3 |
|---|---|---|---|---|---|---|
| Radical polymerizable monomer | NVC | 20.0 | 20.0 | 20.0 | 20.0 | 20.0 |
|  | SR506 | 32.4 | 16.4 | 33.0 | 32.5 | 25.5 |
|  | SR351 | 10.0 | 10.0 | 10.0 | 10.0 | 10.0 |

TABLE 5-continued

|  |  | Example 41 | Example 42 | Comparative example 1 | Comparative example 2 | Comparative example 3 |
|---|---|---|---|---|---|---|
|  | SR454 | 10.0 | 10.0 | 10.0 | 10.0 | 10.0 |
|  | SR9003 | 10.0 | 10.0 | 10.0 | 10.0 | 10.0 |
|  | DVE-3 |  |  |  |  |  |
| Cation polymerizable monomer | CEL2021P |  |  |  |  |  |
|  | OXT-221 |  |  |  |  |  |
| Radical polymerization initiator | TPO | 6.0 | 6.0 | 6.0 | 6.0 | 6.0 |
| Radical sensitizer | ITX | 2.0 | 2.0 | 2.0 | 2.0 | 2.0 |
| C pigment dispersion |  |  |  | 9.0 | 9.0 | 9.0 |
| M pigment dispersion |  |  |  |  |  |  |
| Y pigment dispersion |  |  |  |  |  |  |
| K pigment dispersion |  | 9.0 |  |  |  |  |
| W pigment dispersion |  |  | 25.0 |  |  |  |
| Pigment dispersing resin included in each pigment dispersion | Solsperse 32000 | 0.9 | 2.5 | 0.9 | 0.9 | 0.9 |
| Organic onium salt | CPI-110P | 0.5 | 0.5 |  | 0.5 | 0.5 |
|  | Irgacure290 |  |  |  |  |  |
|  | Ominicat250 |  |  |  |  |  |
|  | Ominicat440 |  |  |  |  |  |
|  | P1-1 |  |  |  |  |  |
|  | P2-1 |  |  |  |  |  |
|  | A1-1 |  |  |  |  |  |
|  | A1-2 |  |  |  |  |  |
| Radical polymerization inhibitor | UV-12 (solid content) |  |  | 0.05 |  | 7.0 |
|  | UV-22 (solid content) | 0.1 | 0.1 |  | 0.03 |  |
|  | OH-TEMPO |  |  |  |  |  |
|  | MEHQ |  |  |  |  |  |
| Mass ratio [Organic onium salt/ Radical polymerization inhibitor] |  | 5.0 | 5.0 | 0 | 16.7 | 0.07 |
| Mass ratio [Organic onium salt/Pigment dispersing resin] |  | 0.56 | 0.20 | 0 | 0.56 | 0.56 |
| Proportion of amount of radical polymerizable monomer to total amount of polymerizable compounds [mass %] |  | 100 | 100 | 100 | 100 | 100 |
| Discharge performance |  | 5 | 5 | 2 | 1 | 2 |
| Releasability |  | 5 | 5 | 1 | 5 | 2 |
| Curability |  | 5 | 5 | 5 | 5 | 1 |

Description of Tables 1 to 5

The values in the columns of the constituents are the contents (% by mass) relative to the total amount of the ink. The blanks mean that the ink did not contain the constituents.

The meanings of the abbreviations used for expressing radical polymerizable monomers are as follows.

NVC . . . N-vinyl caprolactam
SR506 . . . "SR506" produced by Sartomer, isobornyl acrylate
SR351 . . . "SR351" produced by Sartomer, trimethylolpropane triacrylate
SR454 . . . "SR454" produced by Sartomer, ethoxylated (3) trimethylolpropane triacrylate used as an EO-modified trimethylolpropane triacrylate
SR9003 . . . "SR9003" produced by Sartomer, propoxylated (2) neopentyl glycol diacrylate used as a PO-modified neopentyl glycol diacrylate
DVE-3 . . . Triethylene glycol divinyl ether produced by BASF SE The meanings of the abbreviations used for expressing the cation polymerizable monomer, the radical polymerization initiator, the radical sensitizer, the pigment dispersing resin, the organic onium salt, and the radical polymerization inhibitor are as follows.

CEL2021P . . . "CELLOXIDE CEL2021P" produced by Daicel Corporation, 3',4'-epoxycyclohexylmethyl 3,4-epoxycyclohexane carboxylate
OXT-221 . . . "OXT-221" produced by Toagosei Co., Ltd., 3-ethyl-3{[(3-ethyloxetane-3-yl)methoxy]methyl}oxetane
TPO . . . "Omnirad TPO" produced by IGM Resins B.V., 2,4,6-trimethylbenzoyldiphenylphosphine oxide
ITX . . . 2-Isopropylthioxanthone
SOLSPERSE 32000 . . . "SOLSPERSE 32000" produced by Lubrizol (amine resin dispersing agent)
CPI-110P . . . "CPI-110P" produced by San-Apro Ltd. (organic sulfonium salt)
Irgacure 290 . . . "Irgacure 290" produced by BASF SE (organic sulfonium salt)
Omnicat 250 . . . "Omnicat 250" produced by IGM Resins B.V. (organic iodonium salt)
Omnicat 440 . . . "Omnicat 440" produced by IGM Resins B.V. (organic iodonium salt)

P1-1 . . . The above-described compound P1-1 used as an organic phosphonium salt P2-1 . . . The above-described compound P2-1 used as an organic phosphonium salt A1-1 . . . The above-described compound A1-1 used as an organic ammonium salt A1-2 . . . The above-described compound A1-2 used as an organic ammonium salt UV-12 . . . "FLORSTAB UV12" produced by Kromachem, a composition including tris(N-nitroso-N-phenylhydroxylamine) aluminum salt, which is a nitroso aluminum compound, as a solid component UV-22 . . . "Irgastab UV-22" produced by BASF SE, a composition including 2,6-bis(1,1-dimethylethyl)-4-(phenylmethylene)-2,5-cyclohexadine-1-one, which is a quinone compound, as a solid component.

OH-TEMPO . . . 4-Hydroxy-2,2,6,6-tetramethylpiperidine-1-oxyl (produced by Tokyo Chemical Industry Co., Ltd.; nitroxyl radical compound)

MEHQ . . . 4-Methoxyphenol (produced by Tokyo Chemical Industry Co., Ltd.; phenolic compound)

As listed in Tables 1 to 5, in Examples 1 to 42 where the ink included the radical polymerizable monomer, the radical polymerization initiator, the pigment, the pigment dispersing resin, the organic onium salt, and the radical polymerization inhibitor and the content of the radical polymerization inhibitor was 0.05% to 5.0% by mass of the total amount of the ink, the releasability and discharge performance of the ink were excellent. In Examples 1 to 42, the curability of the ink was also excellent.

In contrast, in Comparative Example 1 where the ink did not include the organic onium salt, the releasability and discharge performance of the ink became degraded.

In Comparative Example 2 where the content of the radical polymerization inhibitor was less than 0.05% by mass of the total amount of the ink, the discharge performance of the ink became degraded, although the releasability of the ink was excellent.

In Comparative Example 3 where the content of the radical polymerization inhibitor was more than 5.0% by mass of the total amount of the ink, the curability of the ink became degraded. Furthermore, in Comparative Example 3, the releasability and discharge performance of the ink also became degraded.

Among Examples 31 to 38, in Examples 31 to 37 where the proportion of the amount of the radical polymerizable monomer to the total amount of polymerizable compounds included in the ink was 80% by mass or more, the discharge performance of the ink was more excellent.

Among Examples 8 to 10, in Example 8 where the content of the organic onium salt was 8.0% by mass or less of the total amount of the ink, the releasability of the ink was more excellent.

Among Examples 1 to 8, in Examples 3 to 8 where the content of the organic onium salt was 0.05% to 8.0% by mass or less of the total amount of the ink, the releasability of the ink was more excellent.

Among Examples 8 to 10, in Example 8 where the mass ratio [Organic onium salt/Radical polymerization inhibitor] was 150 or less, the releasability of the ink was more excellent.

Among Examples 5 and 11 to 13, in Examples 5, 11, and 12 where the radical polymerization inhibitor included at least one selected from the group consisting of a nitroso aluminum compound, a quinone compound, and a nitroxyl radical compound, the discharge performance of the ink was more excellent.

Among Examples 5 and 24 to 30, in Examples 5 and 24 to 29 where the ClogP of the organic onium salt was 4.0 or more, the releasability and discharge performance of the ink were more excellent.

Among Examples 5 and 24 to 29, in Examples 5, 24, 25, and 27 to 29 where the ClogP of the organic onium salt was 5.0 or more, the releasability and discharge performance of the ink were more excellent.

Between Examples 1 and 2, in Example 2 where the mass ratio [Organic onium salt/Pigment dispersing resin] was 0.02 or more, the releasability and discharge performance of the ink were more excellent.

Examples 1B to 42B and Comparative Examples 1B to 3B

In Examples 1B to 42B and Comparative Examples 1B to 3B, the same evaluations as in Examples 1 to 42 and Comparative Examples 1 to 3 were made, except that the ink jet head "KM1800i" produced by Konica Minolta, Inc., which was used as an ink jet head, was replaced with an ink jet head "KJ4A-AA" produced by KYOCERA Corporation.

As a result, in Examples 1B to 42B and Comparative Examples 1B to 3B, results similar to those obtained in Examples 1 to 42 and Comparative Examples 1 to 3 were obtained.

Note that "KJ4A-AA" was also a piezoelectric ink jet head (specifically, line head) including a liquid repelling film disposed on the nozzle surface, similarly to "KM1800i".

The liquid repelling film of "KJ4A-AA" was a perfluoroalkyl ether film having a thickness of 1 to 10 nm.

Examples 1C to 42C and Comparative Examples 1C to 3C

In Examples 1C to 42C and Comparative Examples 1C to 3C, the same evaluations as in Examples 1 to 42 and Comparative Examples 1 to 3 were made, except that the ink jet head "KM1800i" produced by Konica Minolta, Inc., which was used as an ink jet head, was replaced with an ink jet head "Samba G3L" produced by FUJIFILM Corporation.

As a result, in Examples 1C to 42C and Comparative Examples 1C to 3C, results similar to those obtained in Examples 1 to 42 and Comparative Examples 1 to 3 were obtained.

Note that "Samba G3L" was also a piezoelectric ink jet head (specifically, line head) including a liquid repelling film disposed on the nozzle surface, similarly to "KM1800i".

The liquid repelling film of "Samba G3L" was a perfluoroalkyl ether film having a thickness of 1 to 10 nm.

Japanese Patent Application No. 2020-056585 filed on Mar. 26, 2020, is incorporated herein by reference in its entirety.

All documents, patent applications, and technical standards referred to herein are incorporated herein by reference in their entirety to the same extent as when the individual documents, patent applications, and technical standards are specifically and individually indicated to be incorporated by reference in its entirety.

What is claimed is:

1. An active energy ray-curable ink comprising:
a radical polymerizable monomer;
a radical polymerization initiator;
a pigment;
a pigment dispersing resin;
an organic onium salt; and
a radical polymerization inhibitor, wherein a content of the radical polymerization inhibitor is 0.05% to 5.0% by mass of a total amount of the active energy ray-curable ink, and the organic onium salt has a ClogP of 3.5 or more.

2. The active energy ray-curable ink according to claim 1, wherein a content of the radical polymerizable monomer is 80% by mass or more of a total amount of a polymerizable compound included in the active energy ray-curable ink.

3. The active energy ray-curable ink according to claim 1, wherein a content of the organic onium salt is 0.01% to 8.0% by mass of the total amount of the active energy ray-curable ink.

4. The active energy ray-curable ink according to claim 1, wherein the content of the organic onium salt is 0.05% to 8.0% by mass of the total amount of the active energy ray-curable ink.

5. The active energy ray-curable ink according to claim 1, wherein a mass ratio of the content of the organic onium salt to the content of the radical polymerization inhibitor is 0.10 to 150.

6. The active energy ray-curable ink according to claim 1, wherein the radical polymerization inhibitor includes at least one selected from the group consisting of a nitroso aluminum compound, a quinone compound, and a nitroxyl radical compound.

7. The active energy ray-curable ink according to claim 1, wherein a mass ratio of the content of the organic onium salt to a content of the pigment dispersing resin is 0.02 or more.

8. An image recording method comprising:
applying the active energy ray-curable ink according to claim 1 to a recording medium to form an ink film, by ejecting the active energy ray-curable ink from an ink jet head including a liquid repelling film disposed on a nozzle surface of the ink jet head; and
irradiating the ink film with an active energy ray.

9. The image recording method according to claim 8, wherein the irradiation includes irradiating the ink film with the active energy ray in an atmosphere having an oxygen concentration of 5% by volume or less.

10. An active energy ray-curable ink comprising:
a radical polymerizable monomer;
a radical polymerization initiator;
a pigment;
a pigment dispersing resin;
an organic onium salt; and
a radical polymerization inhibitor,
wherein a content of the radical polymerization inhibitor is 0.05% to 5.0% by mass of a total amount of the active energy ray-curable ink,
a mass ratio of the content of the organic onium salt to the content of the radical polymerization inhibitor is 0.10 to 150,
and the organic onium salt has a ClogP of 3.5 or more.

11. An active energy ray-curable ink comprising:
a radical polymerizable monomer;
a radical polymerization initiator;
a pigment;
a pigment dispersing resin;
an organic onium salt; and
a radical polymerization inhibitor,
wherein a content of the radical polymerization inhibitor is 0.05% to 5.0% by mass of a total amount of the active energy ray-curable ink, and the organic onium salt has a ClogP of 4 or more.

* * * * *